United States Patent [19]
Takahashi et al.

[11] Patent Number: 5,987,268
[45] Date of Patent: Nov. 16, 1999

[54] FILM LOADING DEVICE HAVING CARTRIDGE POSITIONING SHAFT FOR CAMERA

[75] Inventors: Keita Takahashi, Tsukui-gun; Yasuo Asakura, Hachioji, both of Japan

[73] Assignee: Olympus Optical, Co., Ltd., Tokyo, Japan

[21] Appl. No.: 08/842,724

[22] Filed: Apr. 16, 1997

[30] Foreign Application Priority Data

Apr. 18, 1996 [JP] Japan .................................... 8-097199
Apr. 18, 1996 [JP] Japan .................................... 8-097200

[51] Int. Cl.⁶ ................................................. G03B 17/02
[52] U.S. Cl. ............................................................ 396/538
[58] Field of Search ................................... 396/535, 536, 396/538

[56] References Cited

U.S. PATENT DOCUMENTS 5,664,250  9/1997  Wakabayashi ........................... 396/538

FOREIGN PATENT DOCUMENTS

| 4-234744 | 8/1992 | Japan . |
| 07005543 | 1/1995 | Japan . |
| 07043812 | 2/1995 | Japan . |
| 07168318 | 7/1995 | Japan . |

*Primary Examiner*—Howard B. Blankenship
*Attorney, Agent, or Firm*—Louis Weinstein

[57] ABSTRACT

A film loading device of a camera receiving a film accommodating type cartridge has a cartridge chamber lid turnably supported in a loose state and a positioning shaft having a slidingly supported inclined portion attached to a presser member fixed to the chamber lid. When a cartridge is loaded and the cartridge chamber lid is turned in a closing direction, a fitting portion of the lid is fitted to a cartridge chamber and the positioning shaft is inserted into the positioning hole of the cartridge by being smoothly guided by the inclined surface position thereof and perfectly engaged with the hole. The positioning shaft is securely and smoothly inserted into the loaded cartridge in the film loading device.

25 Claims, 18 Drawing Sheets

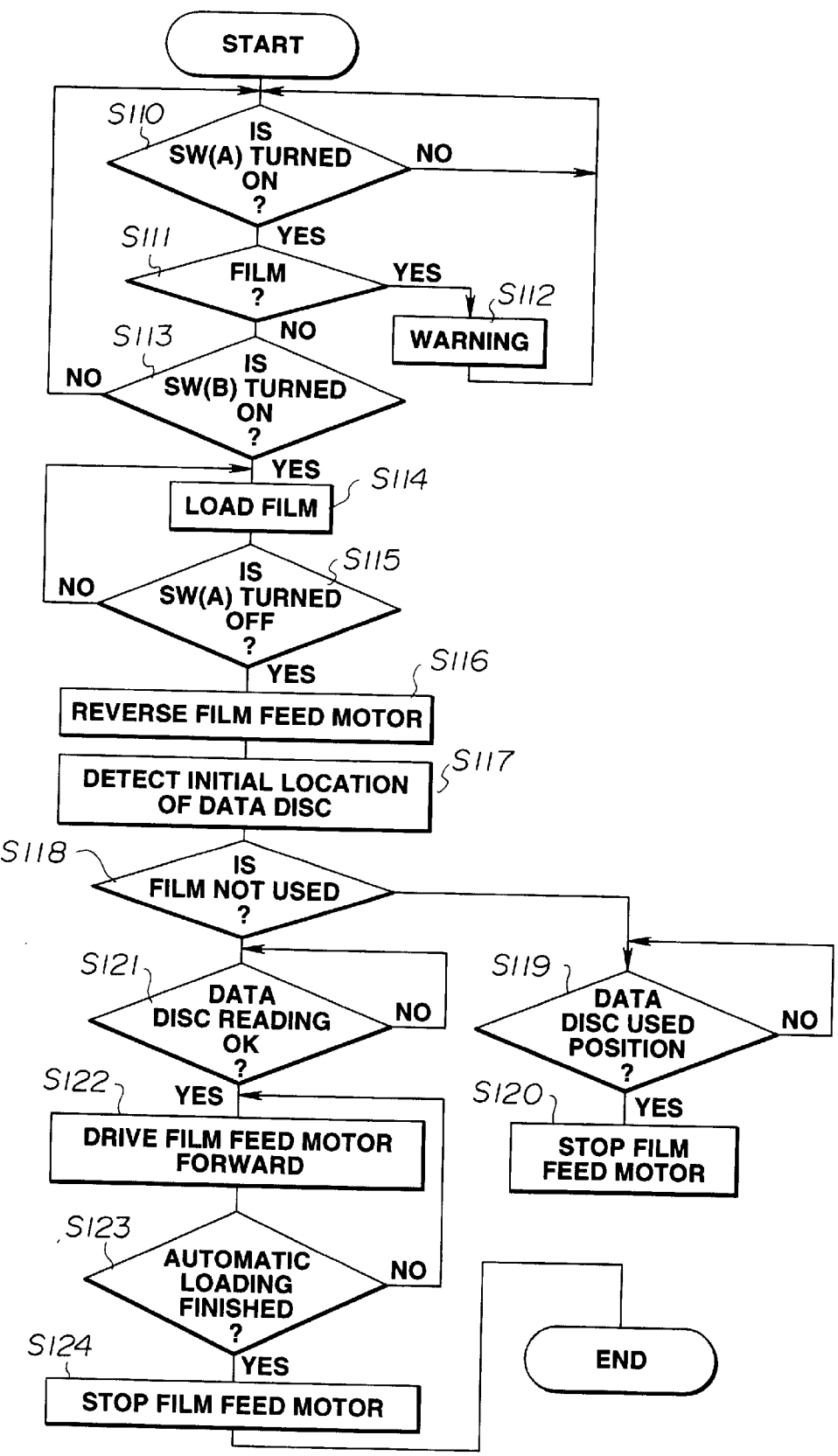

5,987,268

FILM LOADING DEVICE HAVING CARTRIDGE POSITIONING SHAFT FOR CAMERA

BACKGROUND OF THE INVENTION

1. Field of the Invention

The present invention relates to a film loading device for loading and taking-out a film cartridge in which a film is accommodated in a camera using the film cartridge.

2. Related Art Statement

Conventionally, there are cameras using a film cartridge in which a film is accommodated before the cartridge is loaded to the cameras and the film is fed out after the film cartridge is loaded. Japanese Unexamined Patent Publication No. 7-168318 discloses a film loading device for loading and taking out this type of a film cartridge.

In the film loading device, urging means is disposed to a cartridge support member for supporting a film cartridge shaft between it and a fork so as to urge the cartridge in an axial direction, an end of the cartridge shaft is chamfered and the cartridge is supported by causing the semi-spherical or conical support portion of the cartridge support member to be abutted against the chamfered portion and applying an urging force thereto by the urging means.

However, in the film loading device disclosed in Japanese Unexamined Patent Publication No. 7-168318, since the cartridge is supported by the chamfered portion at the end of the cartridge shaft and is not completely fitted thereto, when a radial force is applied to the cartridge, there is a possibility that the cartridge is dislocated.

Japanese Unexamined Patent Publication No. 4-234744 discloses a film loading device having a rotatable cartridge support member for supporting a cartridge which is located at a position confronting the fork of a cartridge chamber through the cartridge. The loaded cartridge is supported by the fork and the cartridge support member. Note, the cartridge support member is supported by the fork and the cartridge support member. Note, the cartridge support member is attached to an openable/closable cartridge chamber lid.

However, in the film loading device disclosed in Japanese Unexamined Patent Publication No. 4-234744, since the extreme end of the cartridge support member on a cartridge engaging side has an end shape having a predetermined uniform inclining angle, the inclined portion at the end is narrow. Thus, when there is positional dislocation between the cartridge and the cartridge support member, it may be difficult for them to engage with each other. In addition, since the positional accuracy of the cartridge chamber lid to the cartridge chamber is not always good, there may be a case that the positional accuracy of a support shaft which is supported by the cartridge chamber lid to position the cartridge to the cartridge chamber is poor. In such a case, since the spool shaft of the cartridge is inclined, there is a danger that film feed operation is made unstable.

Further, Japanese Unexamined Patent Publication No. 7-43812 discloses a film cartridge door opening/closing device arranged such that after a shading cartridge door disposed to the film entrance/exit port of a cartridge, that is, a cartridge shading door is driven by film feed means after a cartridge chamber lid is closed to thereby open a cartridge door. Note, the spool shaft of the cartridge is supported by a spool drive fork and a holding shaft supported by the cartridge chamber lid.

However, the cartridge door opening/closing device disclosed in Japanese Unexamined Patent Publication No. 7-43812 has a danger that the spool shaft of the cartridge is inclined and film feed operation is made unstable.

OBJECT AND SUMMARY OF THE INVENTION

An object of the present invention made to solve the above drawbacks is to provide a film loading device capable of securely and smoothly inserting a positioning shaft for positioning a loaded cartridge and at the same time securely opening and closing a cartridge chamber lid in a camera using the film cartridge in which a film is accommodated.

A film loading device of a camera using a film cartridge of the present invention comprises a camera exterior casing; a camera main body to which a film cartridge chamber for accommodating the film cartridge is disposed; a cartridge chamber lid attached to the camera exterior casing so as to be turnable between the position where the film cartridge chamber is closed and the position where the film cartridge chamber is opened, the cartridge chamber lid being turned about a turning axis as well as capable of sliding in a direction perpendicular to the turning axis; a positioning shaft disposed to the cartridge chamber lid to be coupled with the film cartridge in a state that the cartridge chamber lid is closed for positioning the film cartridge; and a positioning portion disposed to the cartridge chamber lid or a presser member which supports the positioning shaft for positioning the cartridge chamber lid to the film cartridge chamber, whereby the position of the positioning shaft is determined.

Note, other features and advantages of the present invention will be apparent from the following explanation.

BRIEF DESCRIPTION OF THE DRAWINGS

FIG. 27 is a flowchart for automatically loading a film in the camera in FIG. 1;

DESCRIPTION OF THE PREFERRED EMBODIMENT

An embodiment of the present invention will be described with reference to the drawings.

Figure 1:
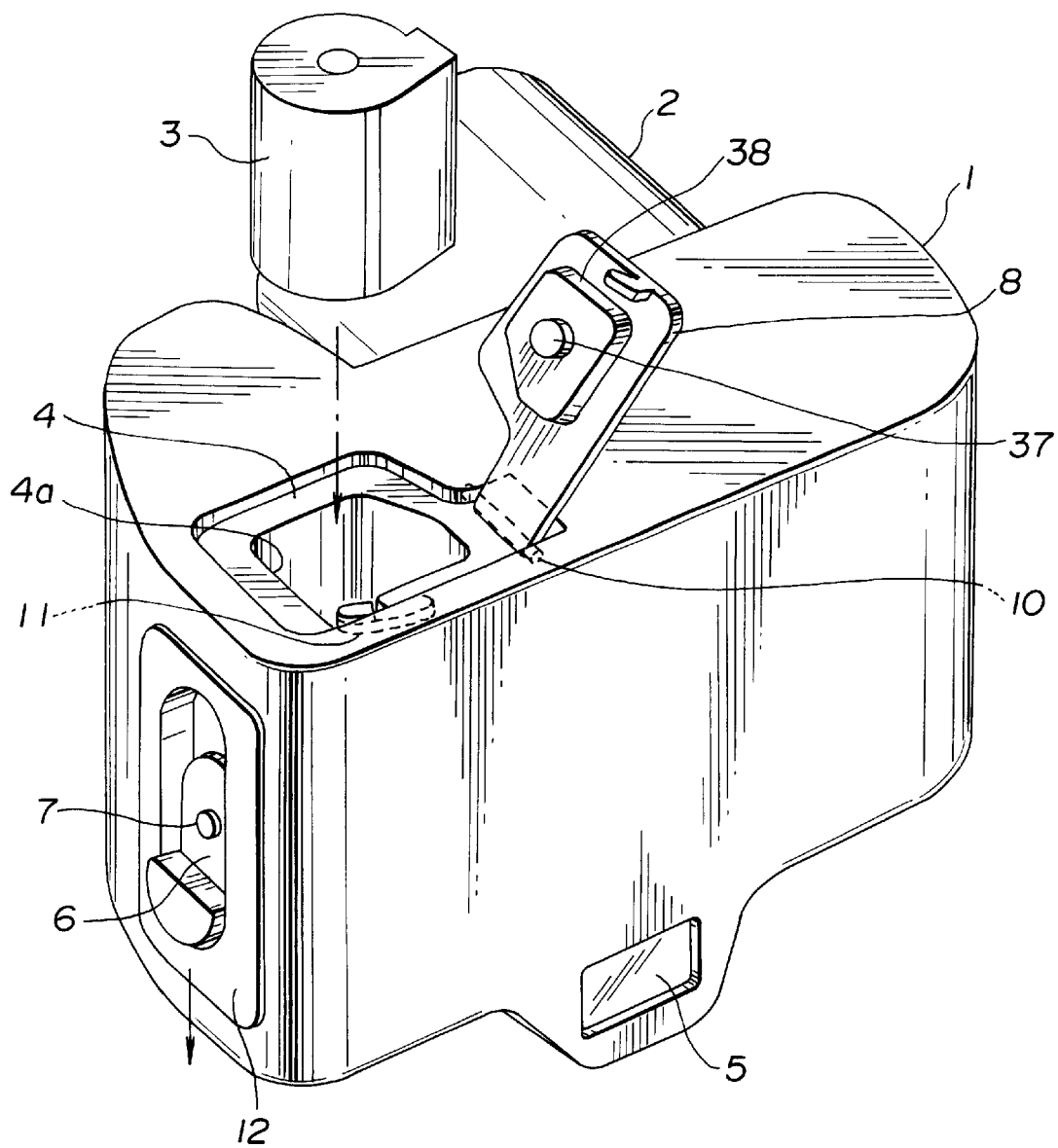
FIG. 1 is a perspective view of a camera to which a film loading device of an embodiment of the present invention is assembled and a film cartridge to be loaded when they are viewed obliquely from the bottom surface of the camera.

FIG. 1 is a perspective view of a camera to which a film loading device of an embodiment of the present invention is assembled and a film cartridge 3 to be loaded when the camera is viewed obliquely from the bottom surface thereof and shows a state that a cartridge chamber lid 8 is opened. Note, the film cartridge 3 used in the camera is a film cartridge which accommodates an entire film before the cartridge is loaded to the camera and the film is fed to the outside of the cartridge after it is loaded. That is, the film cartridge 3 is a film cartridge of a type which is applied to an advanced photographic system.

As shown in FIG. 1, the cartridge chamber lid 8 is attached to the opening of the cartridge chamber 4a of the exterior casing of the camera on the bottom side thereof so as to be openable and closable about a hinge shaft 10 as the center of rotation. The cartridge chamber 4a disposed to a camera main body 4 has an opening which permits the cartridge 3 to be loaded from the axial direction thereof and is kept in a light tight state by closing the cartridge chamber lid 8.

A lens barrel 2 is mounted to the front surface of the camera and a finder 5 is disposed to the back surface of the camera at the upper portion thereof. A cartridge chamber lid releasing knob 6 guided by a cover member 12 is slidingly attached to a side surface of the camera.

A structure of the film loading device assembled to the periphery of the cartridge chamber 4a will be described in detail with reference to FIG. 2 to FIG. 19.

Figure 2:
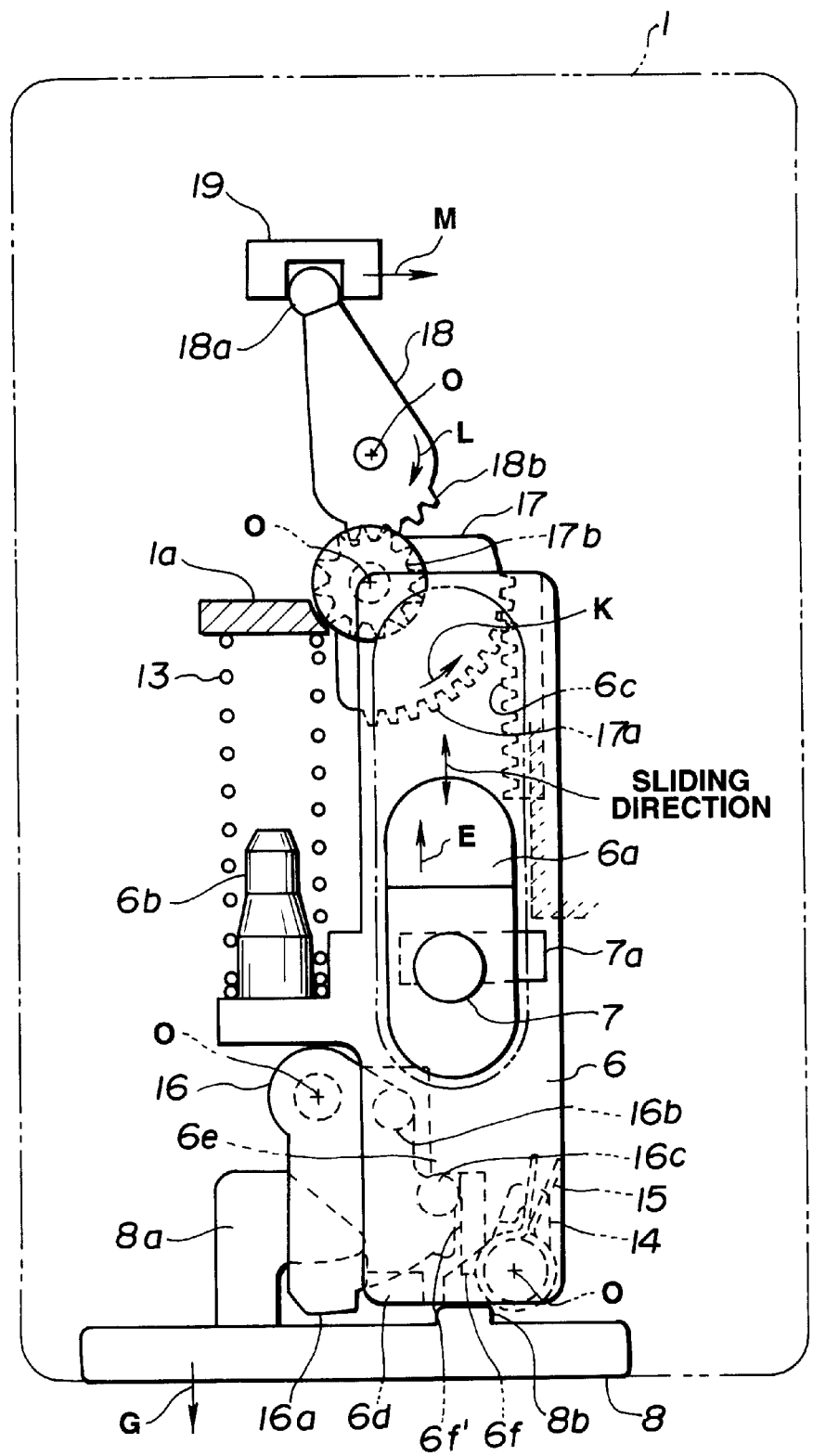
FIG. 2 is a view of the cartridge chamber mechanical portion of the camera in FIG. 1 from which a side cover is removed when viewed from a side surface of the camera and shows a state that a cartridge chamber lid is closed.
Figure 3:
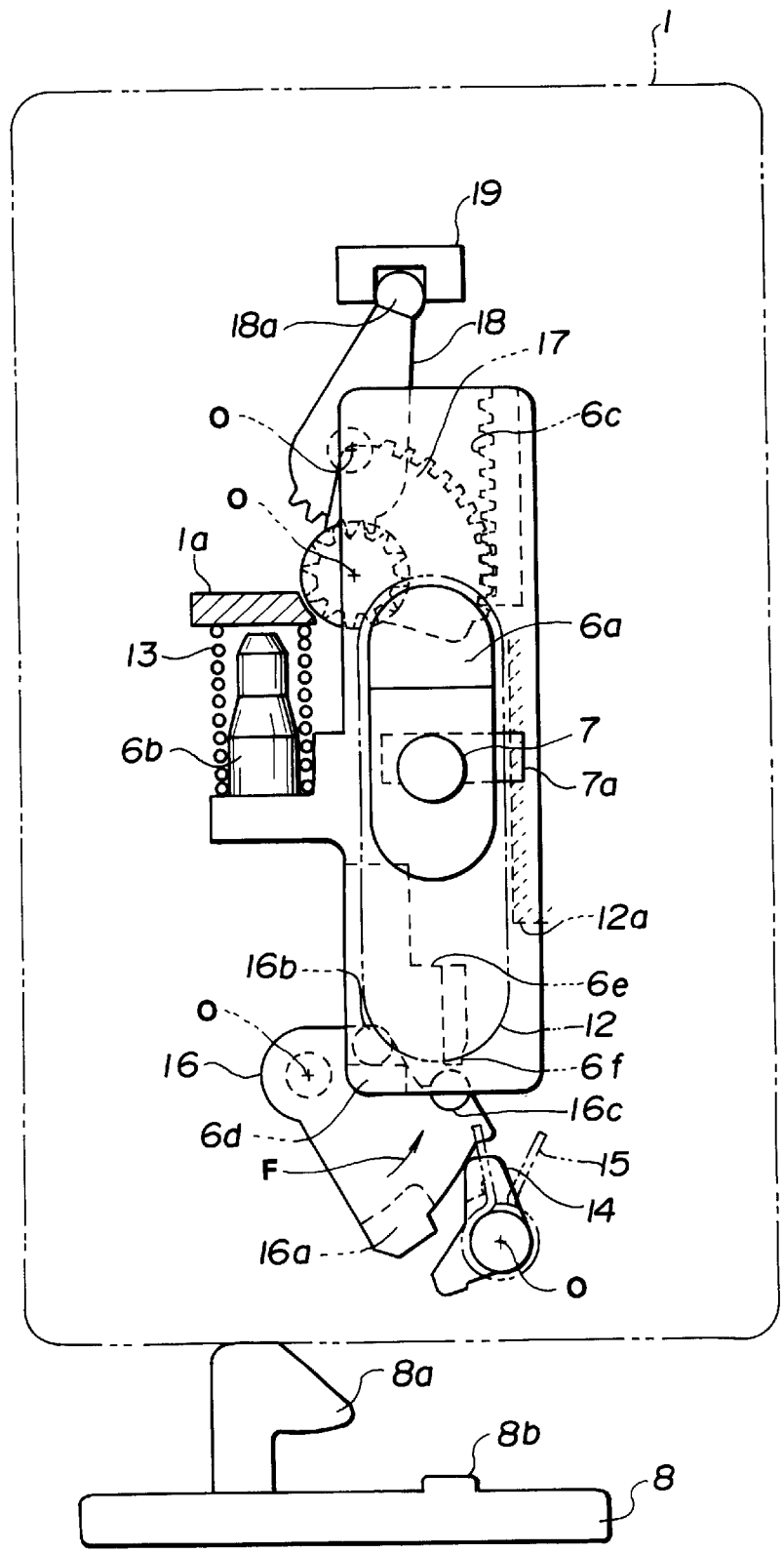
FIG. 3 is a view of the cartridge chamber mechanical portion of the camera in FIG. 1 from which the side cover is removed when viewed from the side surface of the camera and shows a state just after the cartridge chamber lid is opened.
Figure 4:
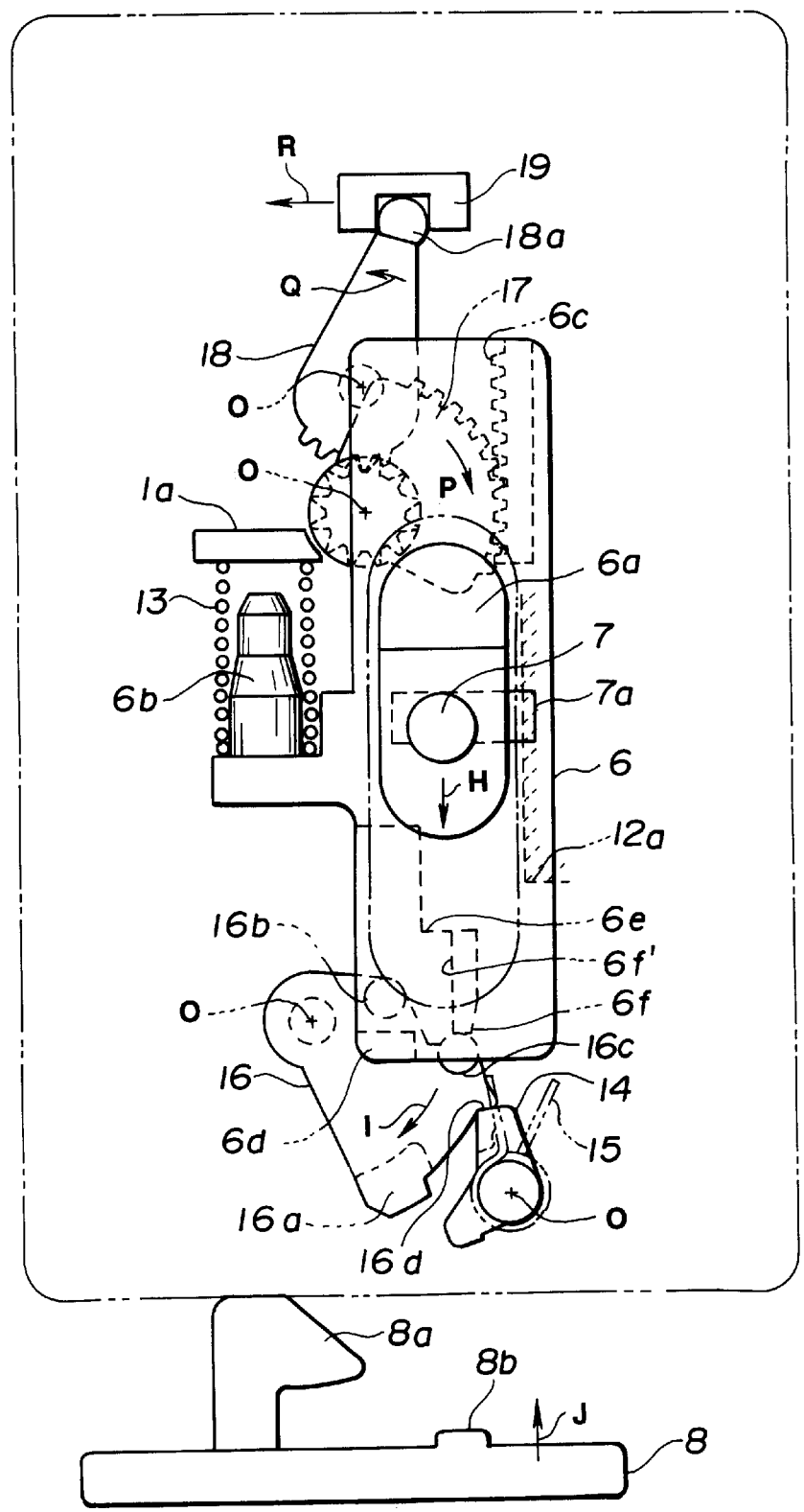
FIG. 4 is a view of the cartridge chamber mechanical portion of the camera in FIG. 1 from which the side cover is removed when viewed from the side surface of the camera and shows a state that a cartridge chamber lid opening knob is locked.

Note, FIG. 2, FIG. 3 and FIG. 4 are views of cartridge chamber lid releasing knob 6 and a cartridge chamber mechanical portion to be operated by the knob 6 in respective operated states viewed from a side of the camera. Among them, FIG. 2 shows a state that the cartridge chamber lid 8 is closed, FIG. 3 shows a state just after the cartridge chamber lid 8 is opened by operating the knob 6 and FIG. 4 shows a state that the knob 6 is locked. Note, FIGS. 2, 3 and 4 are views shown with the bottom of the camera located downward different from FIG. 1.

Figure 5:
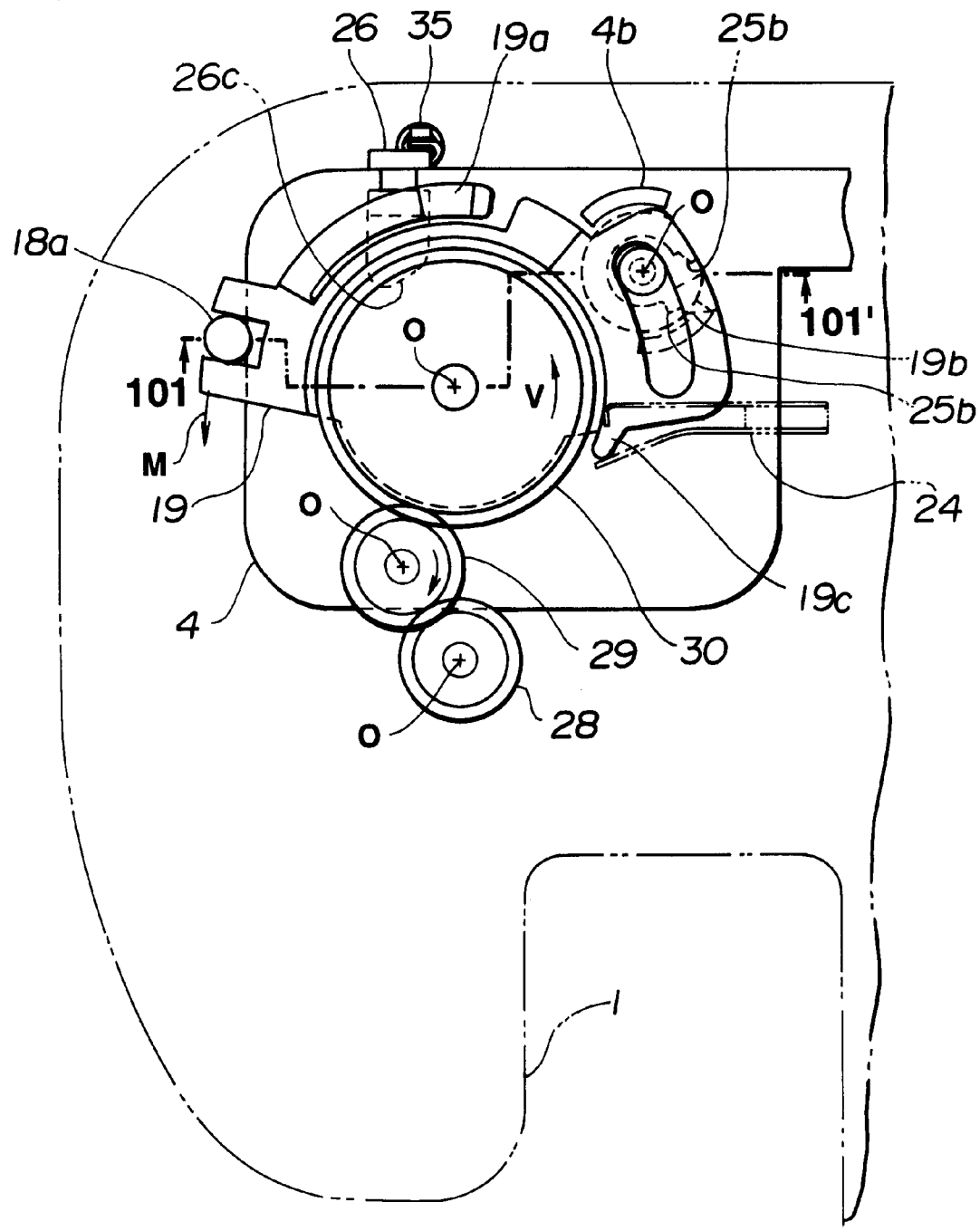
FIG. 5 is a view of the cartridge chamber of the camera in FIG. 1 from which an upper cover is removed when viewed from the upper surface of the camera and shows a state that the cartridge chamber lid is closed.
Figure 6:
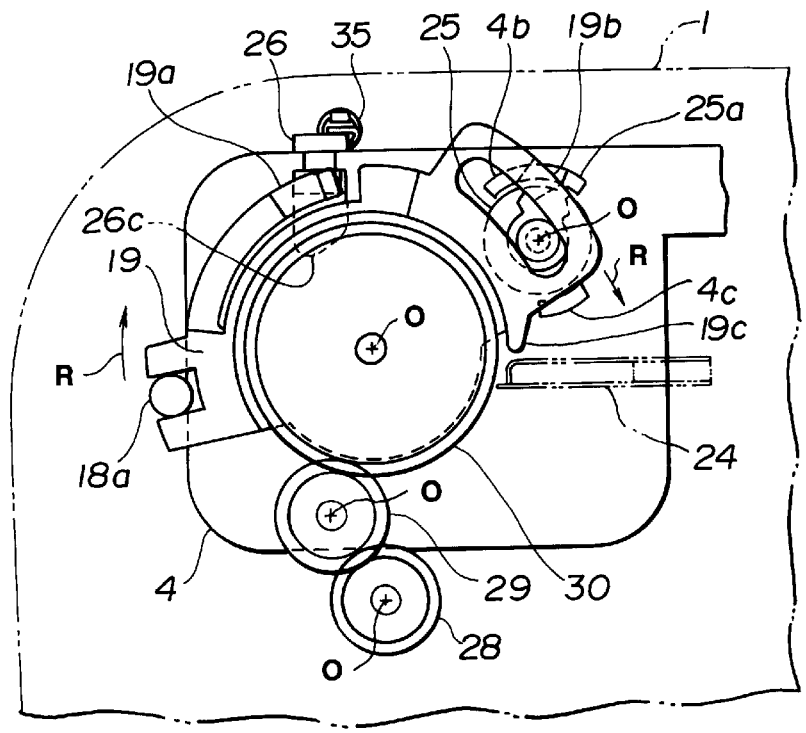
FIG. 6 is a view of the cartridge chamber of the camera in FIG. 1 from which the upper cover is removed when viewed from the upper surface of the camera and shows a state that the cartridge chamber lid is opened.
Figure 7:
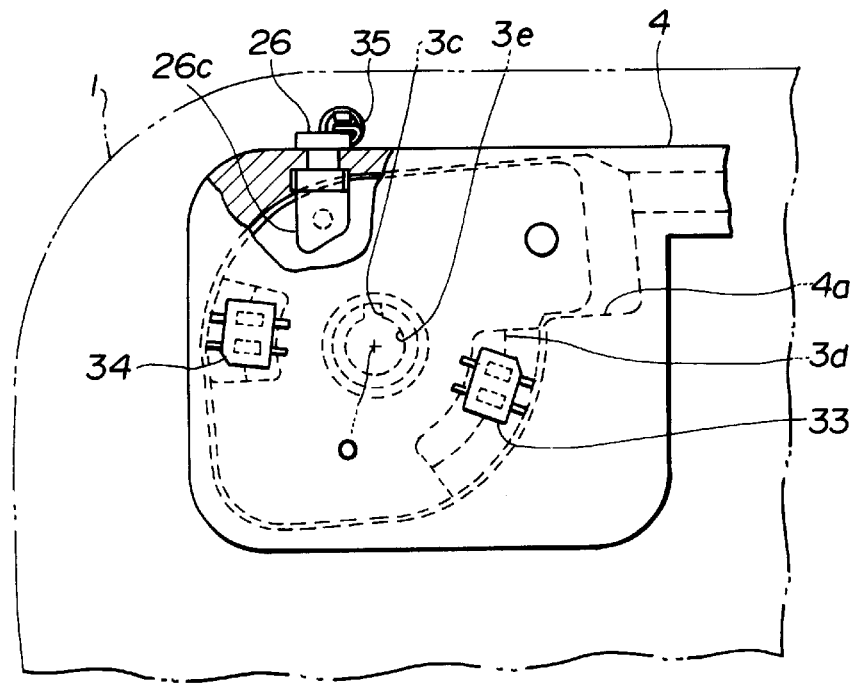
FIG. 7 is a view of the cartridge chamber of the camera in FIG. 1 from which the upper cover is removed when viewed from the upper surface of the camera and shows the disposition of a photoreflector for reading a data disc.
Figure 8:
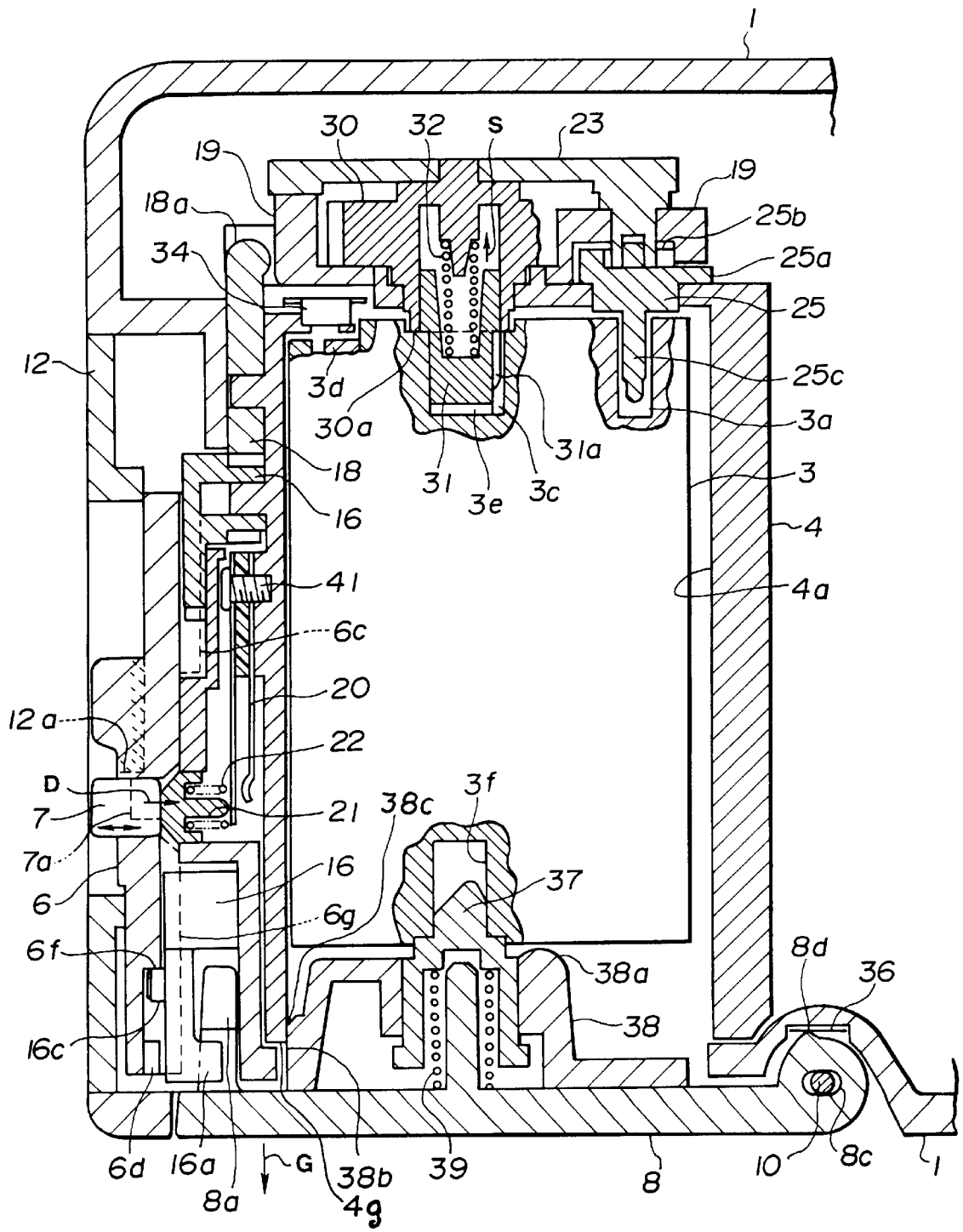
FIG. 8 is a cross sectional view taken along the line 101-101' of FIG. 5 and shows how the cartridge is loaded.

FIGS. 5, 6 and 7 are views of the cartridge chamber from which an upper cover is removed when viewed from the upper surface of the camera, wherein FIG. 5 shows a state that the cartridge chamber lid 8 is closed, FIG. 6 shows a state that the lid 8 is opened and FIG. 7 shows the disposition of a photoreflector for reading a data disc. FIG. 8 is a cross sectional view taken along the line 101-101' of FIG. 5 and shows a state that the cartridge is loaded.

Figure 9:
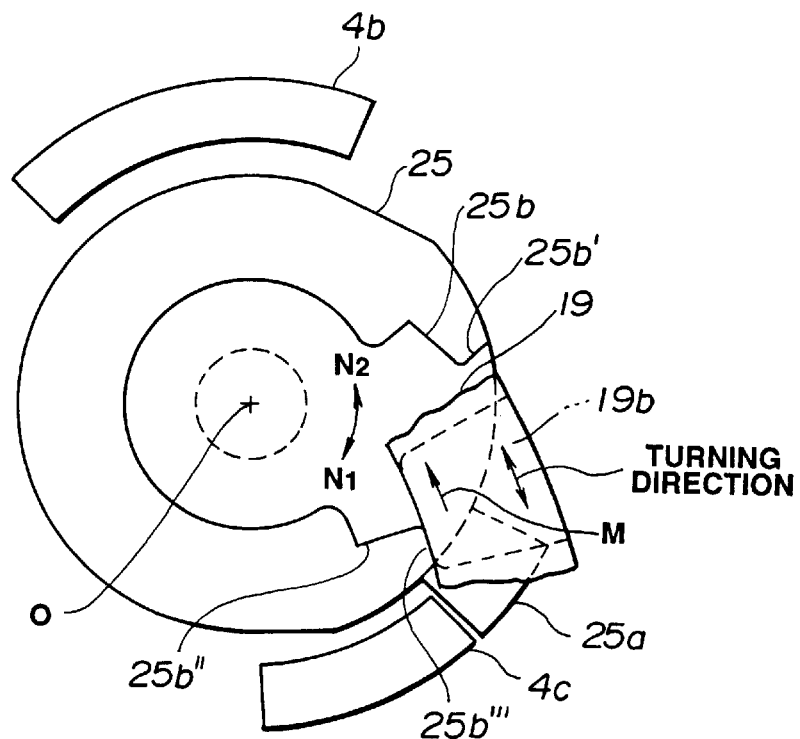
FIG. 9 is a view showing how a shading lid opening/closing lever operates in FIG. 5.
Figure 10:
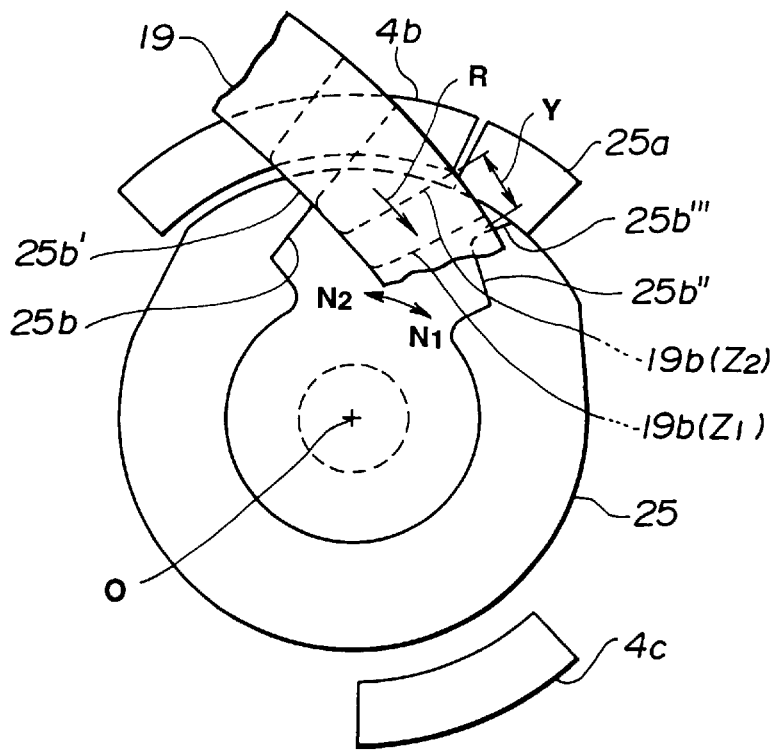
FIG. 10 is view showing how the shading lid opening/closing lever operates in FIG. 6.

FIG. 9 and FIG. 10 are views showing states of a shading lid opening/closing lever in FIGS. 5 and 6, respectively.

Figure 11:
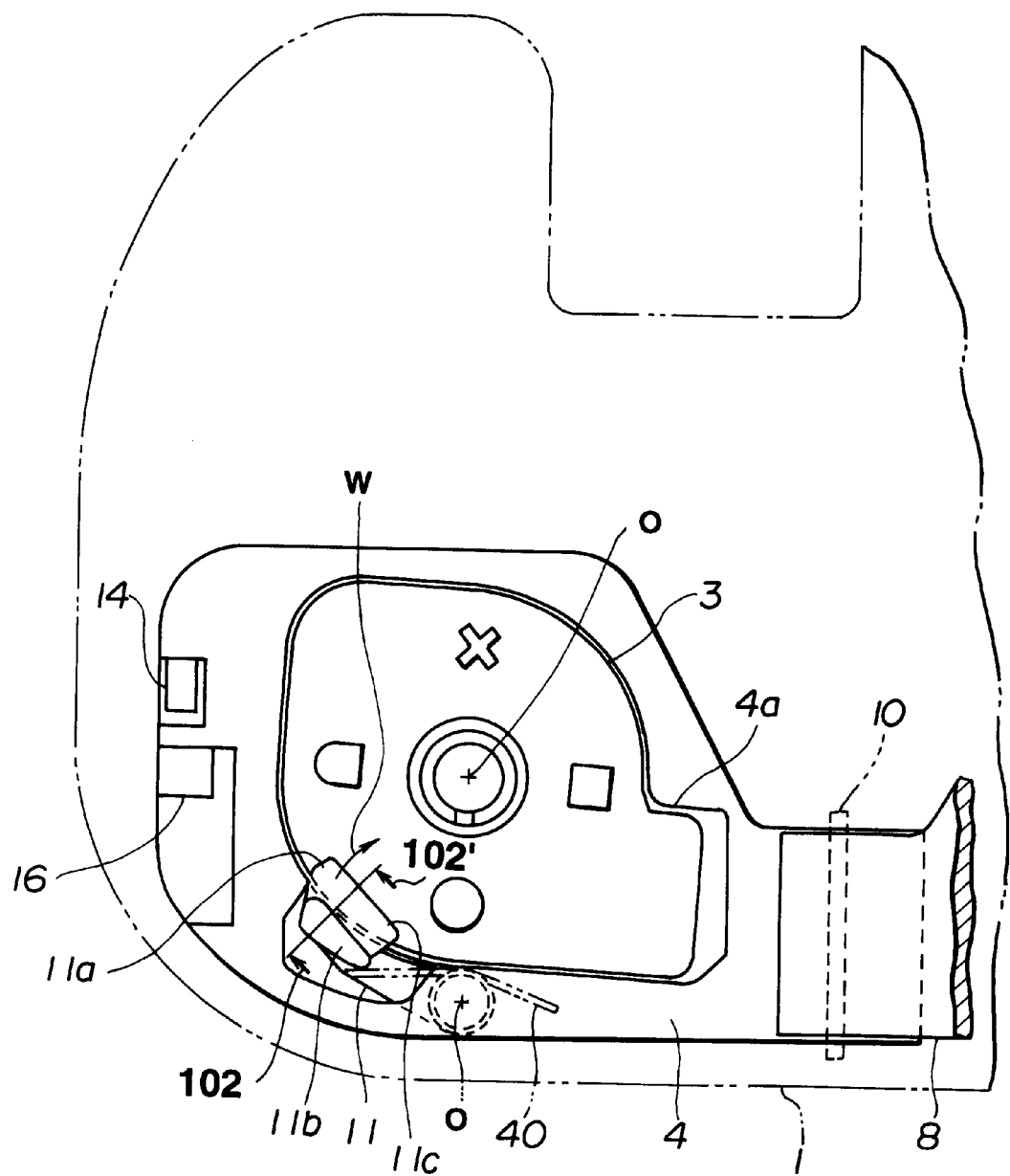
FIG. 11 is a view showing the cartridge chamber of the camera in FIG. 1 when viewed from the bottom surface of the camera and shows a state that the cartridge chamber lid is opened.
Figure 12:
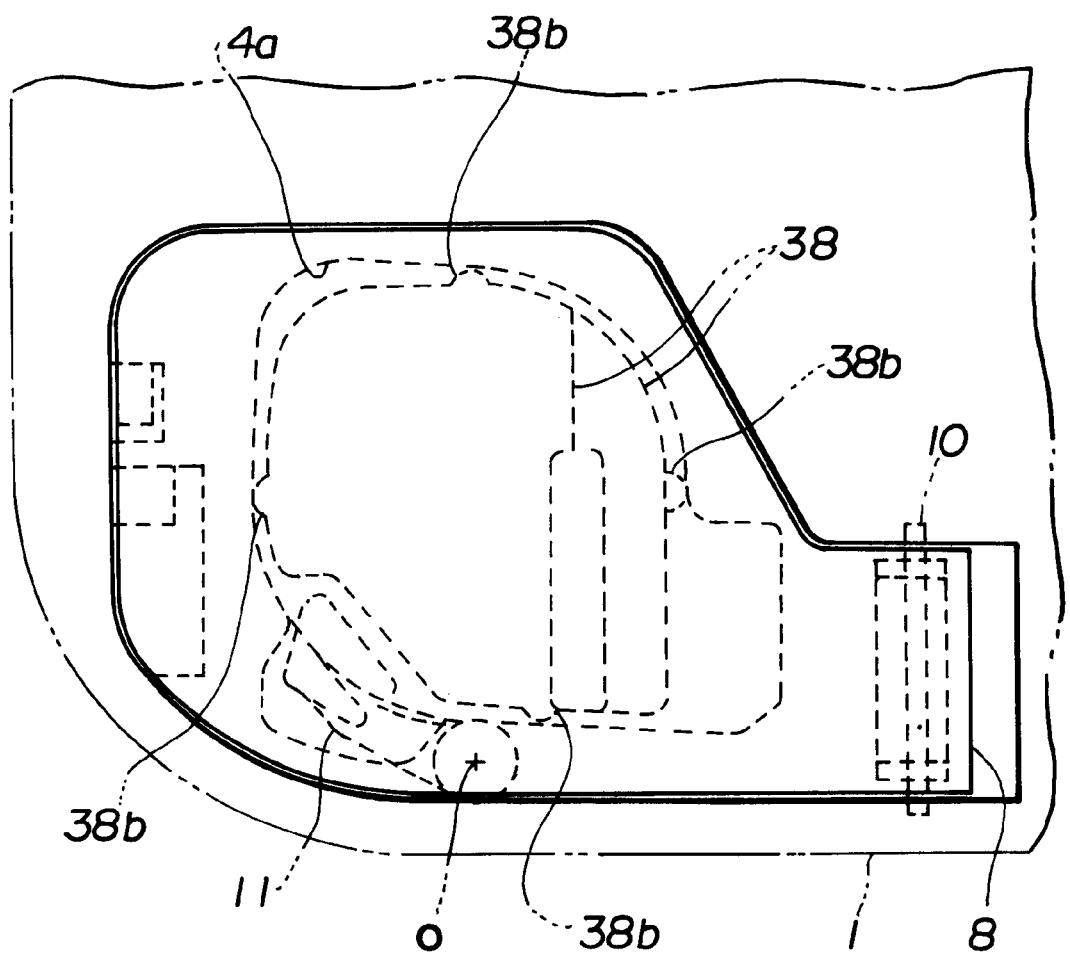
FIG. 12 is a view showing the cartridge chamber of the camera in FIG. 1 when viewed from the bottom surface of the camera and shows a state that the cartridge chamber lid is closed.
Figure 13:
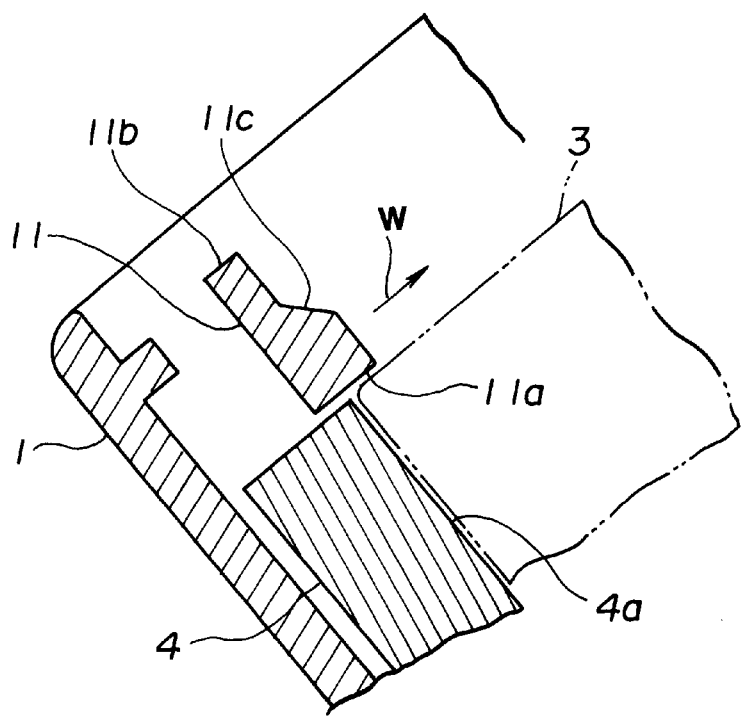
FIG. 13 is a cross sectional view taken along the line 102-102' of FIG. 11.

FIGS. 11 and 12 are views of the cartridge when viewed from the bottom of the camera and shows a state that the cartridge chamber lid 8 is opened and a state that it is closed, respectively. FIG. 13 is a cross sectional view taken along the line 102-102' of FIG. 11.

Figure 14:
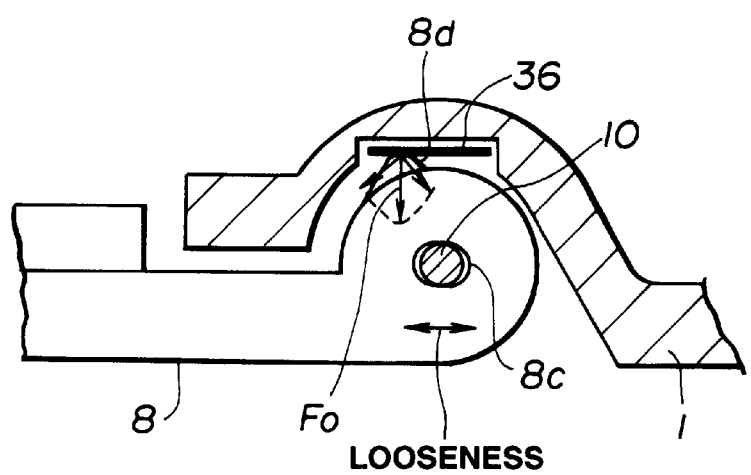
FIG. 14 is a cross sectional view showing the vicinity of the center of rotation of the cartridge chamber lid of the camera in FIG. 1.
Figure 15:
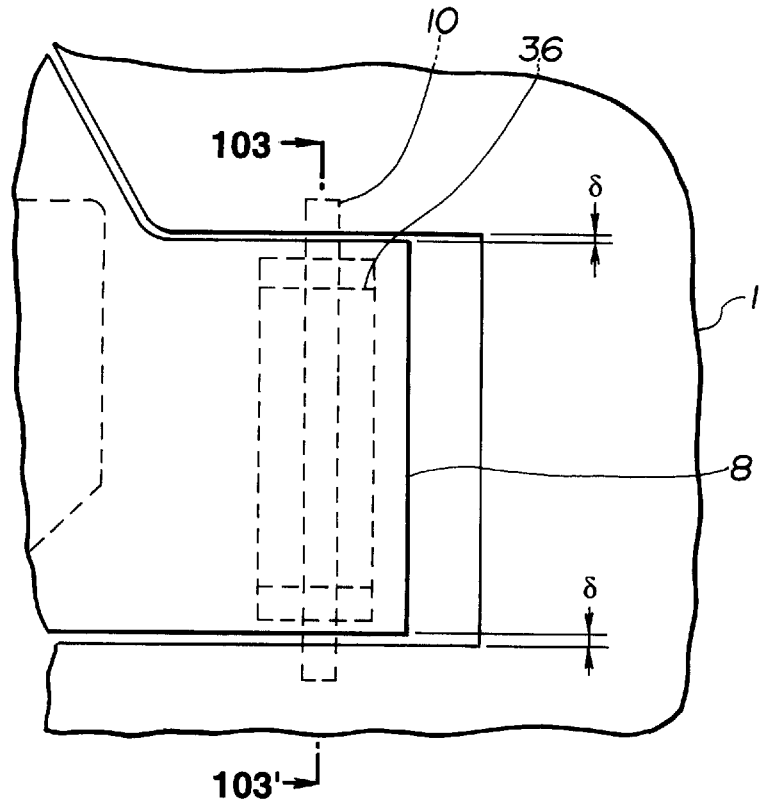
FIG. 15 is a view showing the cartridge chamber lid of the camera in FIG. 1 when viewed from the bottom surface of the camera.
Figure 16:
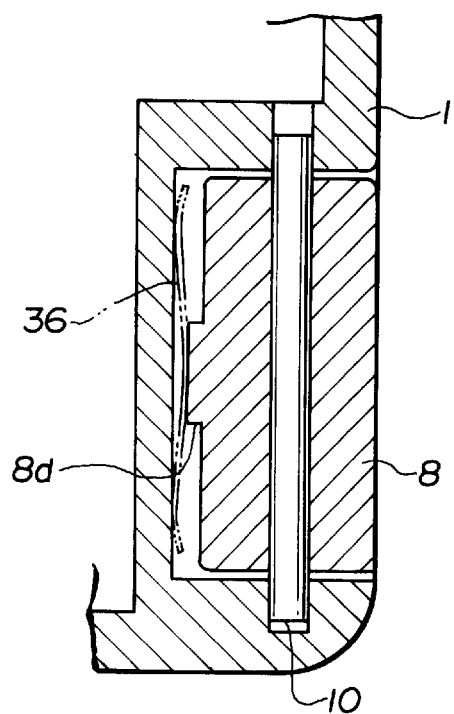
FIG. 16 is a cross sectional view taken along the line 103-103' of FIG. 15.

FIGS. 14, 15 are a cross sectional view showing the vicinity of the center of rotation of the cartridge chamber lid 8 and a view of the camera when viewed from the bottom of the camera. FIG. 16 is a cross sectional view taken along the line 103-103' of FIG. 15.

Figure 17:
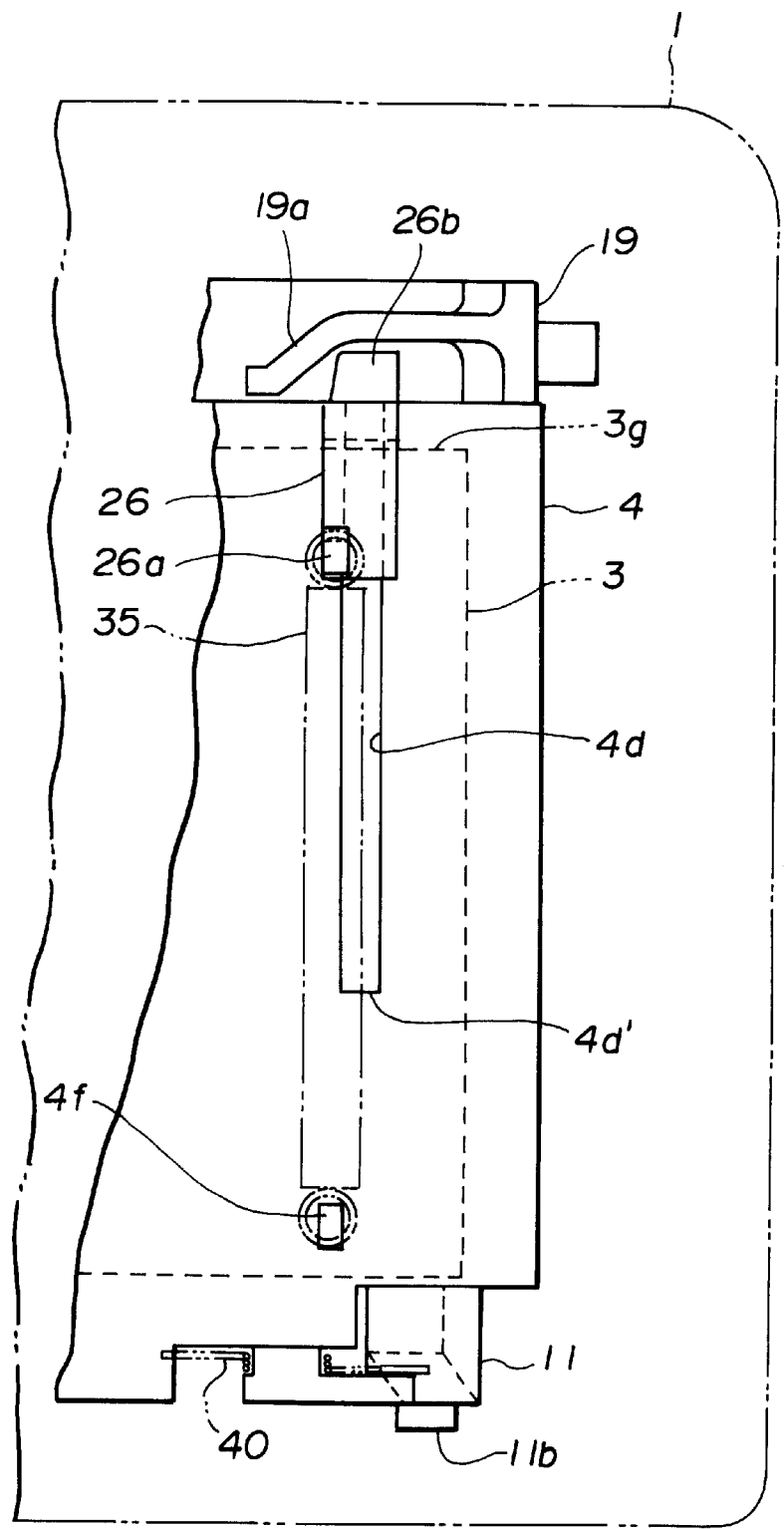
FIG. 17 is a view of the portion around the ejecting rod of the cartridge chamber of the camera in FIG. 1 from which a back cover is removed when viewed from the back surface of the camera.
Figure 18:
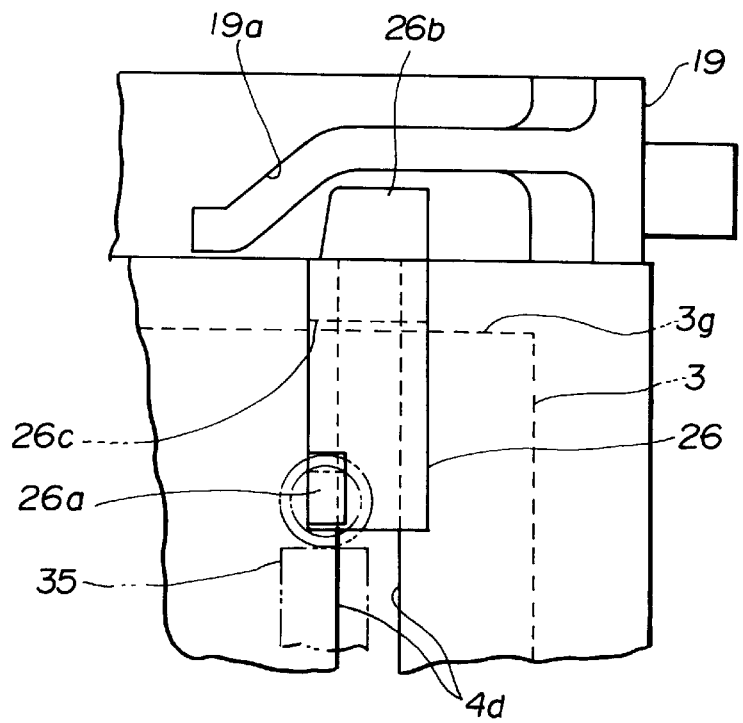
FIG. 18 is a view of the portion around the ejecting rod of the camera in FIG. 1 from which the back cover is removed when viewed from the back surface of the camera and shows a state that a spring portion does not act.
Figure 19:
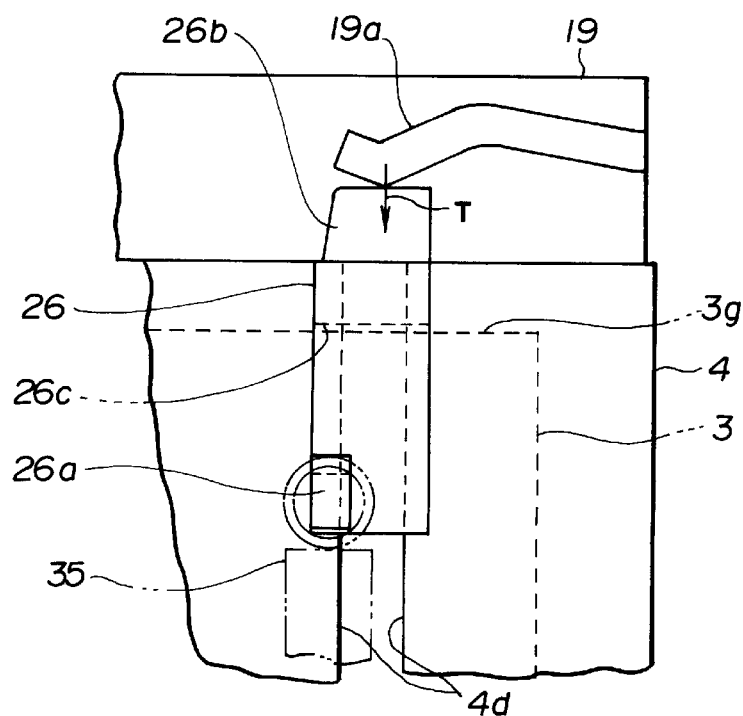
FIG. 19 is a view of the portion around the ejecting rod of the camera in FIG. 1 from which the back cover is removed when viewed from the back surface of the camera and shows a state that the spring portion acts.

FIGS. 17, 18 and 19 are views of the portion of the ejecting rod 26 of the cartridge chamber from which a back cover is removed when viewed from the back surface of the camera. In particular, FIG. 18 shows a state of the ejecting rod 26 when the cartridge chamber lid 8 is closed, FIG. 19 shows a state that the cartridge 3 is located in the cartridge chamber 4a in a state that the cartridge chamber lid 8 is opened.

Note, in the above respective drawings, the portions which have no relation to the description are omitted in the above respective drawings to prevent the complication of the drawings. In addition, portions shown by a point +0 in the drawings show centers of rotation or turning.

First, to describe a structure of the portion around the cartridge chamber lid releasing knob 6, the cartridge chamber lid releasing knob 6 is slidingly attached to the camera exterior casing 1 and covered with the cover member 12 except the area thereof where the knob portion 6a of the knob moves as shown in FIGS. 1, 2 and 8. A lock button 7 is attached to the cartridge chamber lid releasing knob 6 at the position where it can be operated so that it can move in the axial direction thereof and slides together with the cartridge chamber lid releasing knob 6.

The lock button 7 has an arm portion 7a, and when the lock button 7 is not pushed in, it is abutted against the stopper portion 12a of the cover member 12 to thereby prevent the sliding operation of the cartridge chamber lid releasing knob 6.

A button 21 is attached to the camera exterior casing 1 on the side opposite to the operating portion of the lock button 7 so as to be movable in the axial direction.

The other end of the shaft of the button 21 is abutted against the contact piece of a switch (A) 20 (hereinafter, the switch is referred to as SW) fixed to the camera main body 4 by a screw 41, and when the lock button 7 is pushed in, the button 21 moves in the axial direction to thereby turn on (i.e. close) the SW (A) 20. The button 21 is urged by a spring 22 in the direction for pushing out the lock button 7. Usually, the lock button 7 is held at a projected position so that the SW (A) 20 is turned off.

The cartridge chamber lid releasing knob 6 is urged by a spring 13 which is supported by the spring presser 1a of the camera exterior casing 1 and held at the position where the cartridge chamber lid is closed by the urging force.

A key lever 16 is turnably supported by the camera exterior casing 1 and has a hook portion 16a which is engaged with the hook portion 8a of the cartridge chamber lid 8 to thereby hold the cartridge chamber lid 8 at the closed position.

Further, the key lever 16 has lugs 16b and 16c and is turned by being engaged with the lugs 6d, 6e and 6f of the cartridge chamber lid releasing knob 6, respectively.

A lock lever 14 is turnably supported by the camera exterior casing 1 and urged by a spring 15 so as to turn counterclockwise (in FIGS. 2–4). When the cartridge chamber lid 8 is closed, it is pushed by a lock release portion 8b so that the lock lever 14 is stopped at a lock releasing position. Whereas, when the cartridge chamber lid 8 is opened, the lock lever 14 is turned by the spring 15 and engaged with the stopper portion 16d of the key lever 16 to thereby hold the key lever 16 at a cartridge chamber lid opening position.

A gear (A) 17 is a two-stage gear having a large diameter gear portion 17a turnably supported by the camera main body 4 and a small diameter gear portion 17b. The large diameter gear portion 17a is meshed with a rack portion 6c disposed to the cartridge chamber lid releasing knob 6.

A gear (B) 18 is turnably supported by the camera main body 4 and a gear portion 18b formed to the gear (B) 18 is meshed with the small diameter gear portion 17b of the gear (A) 17. Further, the gear (B) 18 has an engaging portion 18a which is disposed to the side opposite to the gear portion 18b and engaged with a drive lever 19.

Next, the opening/closing mechanism of the shading lid of the cartridge 3 will be described with reference to FIG. 5, FIG. 8, FIG. 9 and the like.

The drive lever 19 is turnably supported on the upper side of the cartridge chamber of the camera main body 4 (FIG. 8). An end of the drive lever 19 is engaged with the engaging portion 18a of the gear (B) 18 and turned by turning the gear (B) 18. In addition, the other end of the drive lever 19 has projections 19b and 19c formed thereto.

A shading lid opening/closing lever 25 is turnably supported by the camera main body 4 and a ground plate 23 on the upper portion of the cartridge chamber of the camera main body 4. The shading lid opening/closing lever 25 has a stopper 25a and the turning position thereof is regulated by the stopper 4b and the stopper 4c of the camera main body 4.

The projection 19b of the drive lever 19 is engaged with a cam portion 25b disposed to the shading lid opening/closing lever 25 and the shading lid opening/closing lever 25 is turned by turning the drive lever 19.

Further, the projection 19c of the drive lever 19 is abutted against the contact piece of a SW (B) 24 fixed to the ground plate 23 and turns on and off the SW (B) 24 according to the turn of the drive lever 19.

Note, the shading lid opening/closing lever 25 has a cartridge engaging portion 25c as shown in FIG. 8. The engaging portion 25c is engaged with the shading lid 3a of the film cartridge 3 and the shading lid 3a of the film cartridge 3 is opened and closed by the turn of the shading lid opening/closing lever 25.

Next, a film loading mechanism will be described with reference to FIG. 5, FIG. 7, FIG. 8 and the like.

A rewind gear (A) 28 (hereinafter, referred to as an RW gear) shown in FIG. 5 is rotatably supported by a not shown ground plate and coupled with a film feed motor 51 (see FIG. 20) through a not shown gear train.

An RW gear (B) 29 is rotatably supported by the camera main body 4 and meshed with the RW gear (A) 28. An RW gear (C) 30 is rotatably supported by the camera main body 4 and the ground plate 23 and meshed with the RW gear (B) 29.

An R claw 31 is supported by the shaft portion of the RW gear (C) 30 in such a manner that it is movable toward the cartridge chamber 4a in the axial direction thereof and rotated integrally with the shaft. The R claw 31 has a key 31a which can be engaged with the key seat 3c of the film cartridge 3. The R claw 31 is urged by a spring 32 attached to the hollow portion of the shaft of the RW gear (C) 30 in the direction where it is engaged with the film cartridge 3. When the key 31a of the R claw 31 is engaged with the key seat 3c of the film cartridge 3, the rotational force of the RW gear (C) 30 can be transmitted to the film cartridge 3, so that a film can be rewound and fed.

As shown in FIGS. 5 and 7, a photoreflector (A) 33 and a photoreflector (B) 34 are fixed to the upper portion of the cartridge chamber 4a of the camera main body 4 so as to read the information of the data disk 3d of the film cartridge 3.

Next, a cartridge ejecting mechanism will be described with reference to FIG. 5 and FIG. 17.

The ejecting rod 26 is mounted so as to slide along a guide groove 4d formed along the back surface of the cartridge chamber 4a of the camera main body 4 and urged by a spring 35 suspended by a spring hook portion 26a and a main body spring hook portion 4f in the direction where it pushes out the loaded film cartridge 3 to the outside of the camera on the bottom thereof.

The ejecting rod 26 has a cam portion 26b which, when the drive lever 19 is turned to the cartridge chamber lid opening position, is abutted against the elastically deformable spring portion 19a of the drive lever 19 to thereby apply an urging force to the ejecting rod 26 in the direction where the cartridge 3 is pushed out.

Further, the ejecting rod 26 has an arm portion 26c projecting to the cartridge chamber 4a side. The arm portion 26c is abutted against the upper surface 3g of the loaded film cartridge 3 and pushes out the cartridge 3 by the urging force of the spring 35 and the spring portion 19a of the drive lever 19.

Next, the structure of the portion around the cartridge chamber lid will be described with reference to FIG. 8 and FIG. 11–FIG. 16.

The cartridge chamber lid 8 is mounted so as to turn about a hinge shaft 10 fixed to the camera exterior casing 1 as a turning center. Further, a presser member 38 serving as a cover member is fixed to the cartridge chamber lid 8.

A positioning shaft 37 is attached to the presser member 38 in a state that it can move in the axial direction thereof and cannot be rotated, and is urged by a spring 39 as urging means attached to the presser member 38 in the direction where the cartridge 3 is pressed against the RW gear (C) 30, so that an end surface of the loaded film cartridge 3 is pressed against a reference plane 30a set by the RW gear (C) 30.

The positioning shaft 37 is positioned on plane perpendicular to the shaft of the cartridge 3 by being engaged with the positioning hole 3f of the film cartridge 3. Note, an inclined surface 37a is formed to the extreme end of the positioning shaft 37 to securely position the cartridge as described below.

A cartridge presser portion 38a is formed to the presser member 38 and the cartridge presser portion 38a has a height determined such that when the cartridge 3 is pushed to a certain height in the cartridge chamber 4a, the cartridge presser portion 38a is abutted against the cartridge 3, whereas when the film cartridge 3 is pressed by the positioning shaft 37 and abutted against the reference plane 30a, the cartridge presser portion 38a is not abutted against the cartridge 3 by being spaced apart therefrom.

The presser member 38 has projected fitting portions 38b as positioning portions which can be fitted to the inner periphery of the inserting port of the cartridge chamber 4a in the state that the cartridge chamber lid 8 is closed.

Inclined surfaces 38c are formed to the fitting extreme ends of the fitting portions 38b of the presser member 38 and further chamfered mouth portions 4g are also formed to the cartridge chamber 4a so that the cartridge chamber 4a can be smoothly fitted to the presser member 38.

Note, although the fitting portions 38b serving as the positioning portions of the cartridge chamber lid 8 are formed to the presser member 38 in the device of the embodiment, the positioning member of the cartridge chamber lid 8 may be formed to the cartridge chamber lid 8 itself as a modification of the embodiment.

The hole 8c of the cartridge chamber lid 8 through which the hinge shaft 10 is fitted is formed as a slot which is elongated in a direction perpendicular to the axial direction of the cartridge chamber 4a as shown in FIG. 8 and further a gap δ is defined in the axial direction between opposite sides of the camera exterior casing 1 and associated sides of the cartridge chamber lid 8 as shown in FIG. 15. Therefore, before the cartridge chamber lid 8 is fitted, it is movable in the axial direction of the cartridge 3 on a plane perpendicular to the shaft of the cartridge 3. Then, the position of the cartridge chamber lid 8 on the plane perpendicular to the shaft of the cartridge 3 in the cartridge chamber is determined by the presser member 38 which is fitted to the cartridge chamber 4a. As a result, the loaded cartridge 3 can be positioned with a pinpoint accuracy without depending upon the positional relationship between the camera main body 4 and the camera exterior casing 1.

Note, although the slot 8c is formed to the cartridge chamber lid 8 in the device of the embodiment as described above, a similar advantage can be obtained even if a support hole on the camera exterior casing 1 side for supporting the hinge shaft 10 is arranged as a slot.

A leaf spring 36 is interposed between the cartridge chamber lid 8 and the support portion of the camera exterior casing 1 for supporting the hinge shaft 10 as shown in FIGS. 8 and 14. The leaf spring 36 presses a lug 8d formed to the cartridge chamber lid 8 by an urging force FO. The cartridge chamber lid 8 is urged in an opening direction by the urging force FO.

A cartridge lock lever 11 for holding the loaded film cartridge 3 at a loading position is turnably supported by the camera main body 4 as shown in FIG. 11 and urged by a spring 40 in the direction of an arrow W in the drawing so that it is moved to the position where ejection of the cartridge 3 is prevented. The cartridge lock lever 11 has a cartridge lock portion 11a, a knob portion 11b and an inclined surface portion 11c formed thereto.

As shown in FIGS. 11 and 13, the lock portion 11a of the cartridge lock lever 11 usually projects into the cartridge chamber 4a to thereby prevent the cartridge 3 from being ejected by the ejecting rod 26. The cartridge 3 can be taken out by moving the cartridge lock lever 11 to a retracting position by operating the knob portion 11b in the direction opposite to the arrow W.

As shown in FIG. 13, the inclined surface portion 11c is formed to the cartridge lock lever 11 on the side thereof opposite to the cartridge lock portion 11a, and when it is intended to load the cartridge 3, the cartridge 3 is abutted against the inclined surface portion 11c. Further, when the cartridge 3 is further pushed, an end surface of the cartridge 3 presses the inclined surface portion 11c to thereby move the cartridge lock lever 11 to the retracting position to permit the loading of the film cartridge 3.

Figure 20:
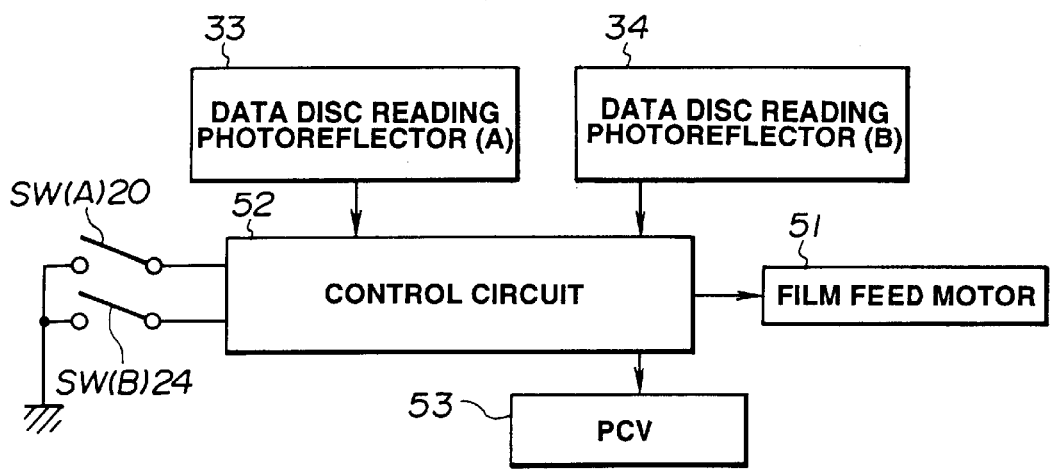
FIG. 20 is a block diagram showing the main arrangement of the controller of the camera in FIG. 1 relating to the film loading device.

FIG. 20 is a block diagram showing the main arrangement of the controller of the camera of the embodiment relating to the film loading device.

The controller is mainly composed of a CPU and includes a control circuit 52 for controlling the camera as a whole, the SW (A) 20 as a switch for detecting the opening operation of the cartridge lid 8 by detecting that the lock button 7 is pushed, the SW (B) 24 as a switch for detecting the open/closed state of the cartridge chamber lid 8 and the closed state of the cartridge shading lid 3a by detecting that the drive lever 19 is turned, a PCV (piezoelectric element) 53 for issuing warning when a film is drawn out at the time the lock button 7 is pressed and it is prohibited to open the cartridge chamber lid 8, the photoreflector (A) 33 and the photoreflector (B) 34 for reading photographing and film information such as a film is not photographed, it is already photographed, a film speed and the like from the data disc provided with the film cartridge 3 and the film feed motor 51 for feeding the film.

Film cartridge loading and taking-out operation in the camera of the embodiment arranged as described will be described.

First, lock release operation of the cartridge chamber lid will be described with reference to FIG. 2, FIG. 3, FIG. 4 and FIG. 8. The cartridge chamber lid releasing knob 6 is slid in the direction of an arrow E in FIG. 2 while the lock button 7 is pushed in the direction of an arrow D in FIG. 8.

At the time, when the cartridge chamber lid releasing knob 6 is operated without pushing the lock button 7, since the arm portion 7a of the lock button 7 is abutted against the stopper portion 12a disposed to the cover member 12, the cartridge chamber lid releasing knob 6 cannot be slid. That is, the pushing operation of the lock button 7 permits the cartridge chamber lid releasing knob 6 to be slid.

When the lock button 7 is pushed, the button 21 also moves in the direction of the arrow D in FIG. 8 to thereby turn on the SW (A) 20. When it is detected by not shown detecting means that a film is drawn out from the film cartridge 3 at the time, the PCV 53 issues warning.

When the cartridge chamber lid releasing knob 6 continues sliding, the lug 16b of the key lever 16 is abutted against the engaging lug 6d of the cartridge chamber lid releasing knob 6. When the cartridge chamber lid releasing knob 6 is further slidably moved, the key lever 16 is turned in the direction of an arrow F in FIG. 3 by the engaging lug 6d to thereby release the engagement of the hook portion 8a of the cartridge chamber lid 8 with the hook portion 16a of the key lever 16, so that the cartridge chamber lid 8 can be opened. At the time, the cartridge chamber lid 8 is slightly turned by the leaf spring 36 in the direction where it is opened, that is, in the direction of an arrow G in FIG. 2 and FIG. 8.

Since the turn of the cartridge chamber lid 8 as described above causes the lock release portion 8b of the cartridge chamber lid 8 to be retracted from a lock release position shown in FIG. 2, the lock lever 14 is permitted to turn. As a result, the lock lever 14 is turned to a lock position shown in FIG. 3 and FIG. 4 by the urging force of the spring 15.

Next, when the sliding operation of the cartridge chamber lid releasing knob 6 is stopped and it is released from an operator's hand, the cartridge chamber lid releasing knob 6 is moved in the direction of an arrow H in FIG. 4 by the urging force of the spring 13. The movement of the knob 6 causes the lug 6f of the cartridge chamber lid releasing knob 6 to be abutted against the lug 16c of the key lever 16.

When the cartridge chamber lid releasing knob 6 is further moved, the key lever 16 is rotated in the direction of an arrow I in FIG. 4 and the stopper portion 16d of the key lever 16 is stopped by being abutted against the lock lever 14. The abutment of the stopper portion 16d prevents the movement of the cartridge chamber lid releasing knob 6 and stops it. In this state, it is possible to take out and load the film cartridge 3.

When the cartridge has been taken out or loaded and the cartridge chamber lid 8 is kept turning in the direction of an arrow J in FIG. 4, the lock releasing portion 8b of the cartridge chamber lid 8 pushes the extreme end of the lock lever 14 to thereby turn the lock lever 14 to the lock release position.

The turning of the lock lever 14 releases the key lever 16 locked the lock lever 14 to thereby permit the key lever 16 to turn. The key lever 16 is moved to the position where the hook portion 8a of the cartridge chamber lid 8 can be engaged with the hook portion 16a of the key lever 16 by being pushed by the lug 6f of the cartridge chamber lid releasing knob 6. When the key lever 16 moves to the position where it is engaged with the cartridge chamber lid 8, the abutment of the lug 6f of the cartridge chamber lid releasing knob 6 against the lug 16c of the key lever 16 is released, so that turning of the key lever 16 is stopped.

Thereafter, the key lever 16 is prohibited to turn in the direction where the engagement of the key lever 16 with the cartridge chamber lid 8 is released by the side wall 6f' of the lug 6f of the cartridge chamber lid releasing knob 6. Thus, the engaged state is maintained.

Although the SW (A) 20 is held in an on-state due to the button 21 being pushed by a guide rib 6g while the cartridge chamber lid releasing knob 6 is in sliding operation, when the cartridge chamber lid releasing knob 6 returns to an initial position shown in FIG. 2 and FIG. 8, the button 21 is pushed out by the spring 22, so that the lock button 7 is projected to the lock position as well as the SW (A) 20 being turned off.

Next, opening/closing operation of the shading lid 3a of the film cartridge 3 will be described with reference to FIG. 2–FIG. 6 and FIG. 8–FIG. 10.

When the cartridge chamber lid releasing knob 6 is slid in the direction of the arrow E in FIG. 2, since the rack portion 6c of the cartridge chamber lid releasing knob 6 is meshed with the large diameter gear portion 17a of the gear (A) 17, the gear (A) 17 is turned in the direction of an arrow K in FIG. 2. Further, since the small diameter gear portion 17b of the gear (A) 17 is meshed with gear teeth 18b of gear (B) 18, the gear (B) 18 is turned in the direction of an arrow L in FIG. 2.

Since the engaging portion 18a of the gear (B) 18 is engaged with the drive lever 19, when the gear (B) 18 turns, the drive lever 19 is turned in the direction of an arrow M in FIG. 2, FIG. 5 and FIG. 9 and set to a state shown in FIG. 6 and FIG. 10.

The SW (B) 24 is turned on (i.e. closed) as shown in FIG. 6 by the turn of the drive lever 19 as described above. When the SW (B) 24 is turned on, a control circuit 52 (see FIG. 20) determines that the cartridge chamber lid 8 is opened.

The turn of the drive lever 19 from the state shown in FIG. 2 causes the lug 19b of the drive lever 19 to turn in the direction of the arrow M in FIG. 9. When the lug 19b of the drive lever 19 is kept turning, it is abutted against the cam portion 25b of the shading lid opening/closing lever 25. When the drive lever 19 further turns, the cam portion 25b of the shading lid opening/closing lever 25 is pushed to thereby turn the shading lid opening/closing lever 25 to a position shown in FIG. 10. However, at the time, the lug 19b of the drive lever 19 is located at a position Z1 in FIG. 10.

When the shading lid opening/closing lever 25 turns to the position Z1 shown in FIG. 10, the abutment of the lug 19b of the drive lever 19 against the cam portion 25b of the shading lid opening/closing lever 25 is released and the turn of the shading lid opening/closing lever 25 is stopped. Thus, the shading lid 3a of the cartridge 3 is closed at this position.

The drive lever 19 further continues to turn and when the cartridge chamber lid releasing knob 6 reaches a position a little short of a maximum stroke position where it reaches in a locked state, the drive lever 19 further turns from the position Z1 in FIG. 10 to a position Z2. At the time, The turn of the shading lid opening/closing lever 25 in the direction of an arrow N1 is regulated by the abutment of the cam portion 25b''' of the shading lid opening/closing lever 25 against the lug 19b of the drive lever 19. The turn of the shading lid opening/closing lever 25 in the direction of an arrow N2 is regulated by the abutment of the stopper 25a of the shading lid opening/closing lever 25 against the stopper 4b of the camera main body 4.

An overstroke section between the position Z1 and the position Z2, that is, a section where the drive lever 19 turns after the completion of the drive of the shading lid opening/closing lever 25 is provided by the lug 19b of drive lever 19, a timing at which the key lever 16 operates is set to release the engagement of the key lever 16 with the cartridge chamber lid 8 when the overstroke section is reached. The timing set as described above prohibits the cartridge chamber lid 8 to be opened before the shading lid 3a of the film cartridge 3 is completely closed, by which an accident that a film is exposed can be prevented.

Since the rotation of the shading lid opening/closing lever 25 is regulated by the stopper 4b of the camera main body 4 and the lug 19b of the drive lever 19, an accurate stop position can be ensured and further since the shading lid opening/closing lever 25 is not rotated carelessly, the shading lid 3a of the film cartridge 3 does not open when the cartridge 3 is taken out from the camera main body 4.

When the cartridge chamber lid releasing knob 6 keeps moving in the direction of the arrow H in FIG. 4, the gear (A) 17 and the gear (B) 18 turn in the directions of an arrow P and an arrow Q in FIG. 4, respectively and the drive lever 19 turns in the direction of an arrow R in FIG. 4, FIG. 6 and FIG. 10. At the time, the lug 19b of the drive lever 19 also turns in the direction of the arrow R in FIG. 4

When the lug 19b of the drive lever 19 keeps turning, it is abutted against the cam portion 25b'' of the shading lid opening/closing lever 25. When the drive lever 19 further turns, the cam portion 25b'' of the shading lid opening/closing lever 25 is pushed by it and the shading lid opening/closing lever 25 is turned to a position shown in FIG. 9.

When the shading lid opening/closing lever 25 is turned to the position shown in FIG. 9, the abutment of the lug 19b of the drive lever 19 against the cam portion 25b'' of the shading lid opening/closing lever 25 is released and the turn of the shading lid opening/closing lever 25 is stopped. The shading lid 3a of the cartridge 3 is opened at the position.

Note, when the cartridge chamber lid releasing knob 6 moves to a position shown in FIG. 2 and FIG. 8, the drive lever 19 moves to the above position shown in FIG. 9. The drive lever 19 is provided with an overstroke section for its turn after the turn of the shading lid opening/closing lever 25 stops, that is, after the shading lid is opened and the overstroke section is set such that the SW (A) 20 is turned off in the section.

Further, as shown in FIG. 10, there is provided a play section Y in which the drive lever 19 starts movement and the lug 19b of the drive lever 19 is abutted against the cam portion 25b'' of the shading lid opening/closing lever 25 and the timing at which the key lever 16 operates is set so that the key lever 16 is engaged with the cartridge chamber lid 8 within the play section Y.

Since the operation timing is set as described above, it can be prevented that the shading lid 3a of the film cartridge 3 is opened before the cartridge chamber lid 8 is completely closed. Thus, an accident that the film is exposed by insufficient shading of the cartridge chamber 4a can be prevented.

Since the rotation of the shading lid opening/closing lever 25 is regulated by the stopper 4c of the camera main body 4 and the lug 19b of the drive lever 19, an accurate stop position can be ensured and further since the shading lid opening/closing lever 25 is not rotated carelessly, the shading lid is not closed while the film is fed.

Next, taking-out and loading operation of the film cartridge 3 will be described with reference to FIG. 2, FIG. 5, FIG. 8 and FIG. 11–FIG. 19.

First, the cartridge chamber lid releasing knob 6 is operated and the engagement of the key lever 16 with the cartridge chamber lid 8 is opened to take out the film cartridge 3, since the cartridge chamber lid 8 is slightly lifted by the urging force of the leaf spring 36, it is possible to move the cartridge chamber lid 8 to the open position by putting a finger thereon. When the cartridge 3 has been loaded in the cartridge chamber 4a, the film cartridge 3 can be taken out from the cartridge chamber.

Although the cartridge 3 is urged by the ejecting rod 26 in the direction where it projects from the camera main body 4 to the outside of the camera, the movement thereof is prevented by the cartridge lock lever 11. This prevention is made to prevent the cartridge 3 from falling from the camera if the cartridge chamber lid 8 should be opened with the opening of the cartridge chamber facing downward to take out the cartridge 3 from the camera.

When the knob portion 11b of the cartridge lock lever 11 is operated in the direction opposite to the direction of the arrow W in FIG. 11 in the state that the cartridge chamber lid 8 is opened, the engagement of the cartridge lock lever 11 with the cartridge 3 is released. The releasing operation causes the ejecting rod 26 to be moved along the guide groove 4b of the camera main body 4 by the urging force of the spring portion 19a of the drive lever 19 and the urging force of the spring 35 to be described below to thereby push out the cartridge 3. Then, the ejecting rod 26 is stopped by being abutted against the stopper 4d' of the camera main body 4. Since the film cartridge 3 moves to the position where it can be taken out by being picked up between fingers from the bottom of the camera, it can be taken out to the outside of the cartridge chamber by being picked up between the fingers.

Incidentally, when the film cartridge 3 is in the state shown in FIG. 8, the R claw 31 and the shading lid opening/closing lever 25 are engaged with the film cartridge 3. Thus, to extract them from the cartridge 3, an extra force is required in addition to a force necessary to lift only the film cartridge 3. However, when the extra force is applied to the film cartridge 3 at all times, film feed operation is made unstable.

To cope with this problem, in the cartridge loading device of the present invention, the spring portion 19a, which is provided an integral part of the drive lever 19, and the R claw 31 and a force for extracting the R claw 31 and the shading lid opening/closing lever 25 from the cartridge 3 is secured by the urging force made by the elastic deformation of the spring portion 19a. On the other hand, the spring 35 which always applies a load to the cartridge 3 is set to make a weak force capable of ejecting the cartridge 3 against the dead load of the cartridge 3.

That is, the force is set to such a weak degree as to be capable of lifting the cartridge 3 even if the opening of the cartridge chamber 4a faces upward. Whereas, the spring portion 19a of the drive lever 19 applies such a relatively strong degree of urging force as to be able to extract the R claw 31 and the shading lid opening/closing lever 25 from the cartridge 3 when the spring portion 19a of the drive lever 19 rides on the cam portion 26a and the stroke of the spring portion 19a is set to a stroke which is necessary to extract the R claw 31 and the shading lid opening/closing lever 25.

When the cartridge chamber lid releasing knob 6 is at the position shown in FIG. 2 and FIG. 8, since the cam portion 26b of the ejecting rod 26 is not in contact with the spring portion 19a of the drive lever 19 as shown in FIG. 18, only the tension of the spring 35 is applied to the ejecting rod 26.

When the cartridge chamber lid releasing knob 6 is operated in the direction of the arrow E in FIG. 2, the drive lever 19 is turned in the direction of the arrow M in FIG. 5 as described above. The ejecting rod 26 is urged in the direction of an arrow T in FIG. 19, that is, in the direction where the cartridge is ejected by the elastic deformation of the spring portion 19a of the drive lever 19, so that the cartridge 3 can be securely extracted from the R claw 31 and the shading lid opening/closing lever 25.

Next, loading operation of the cartridge 3 will be described.

First, the cartridge 3 is pushed into the cartridge chamber 4a. At the time, since the cartridge lock lever 11 is urged by the spring 40, it projects into the opening of the cartridge chamber 4a. However, since the cartridge lock lever 11 is moved to the retracting position by the film cartridge 3 which pushes the inclined surface portion 11c of the cartridge lock lever 11, the cartridge 3 can be loaded.

When the cartridge 3 is further pushed to the position where it can be locked by the cartridge lock lever 11, the cartridge 3 is locked by the cartridge lock lever 11. At the time, since the shading lid 3a of the cartridge 3 is engaged with the cartridge engaging portion 25c of the shading lid opening/closing lever 25, when the shading lid opening/closing lever 25 is driven, the shading lid 3a of the cartridge 3 can be opened.

Next, when the cartridge chamber lid 8 is closed, the lock lever 14 moves to the lock release position to thereby release the lock of the cartridge chamber lid releasing knob 6 and the cartridge chamber lid releasing knob 6 moves to the position shown in FIG. 2 and FIG. 8. During that time, the cartridge chamber lid 8 is locked at the closed position by the key lever 16 and further the shading lid 3a of the cartridge 3 is opened and automatic loading starts.

At the time, the position of the cartridge 3 on a plane which is perpendicular to the axis of the cartridge 3 is determined by the positioning shaft 37 as well as being lifted by the spring 39 and positioned on the reference plane 30a. That is, since the positioning shaft 37 is pressed against the cartridge 3 by the spring 39 with respect to the axial direction of the cartridge 3, the positional relationship between the cartridge chamber lid 8 and the cartridge chamber 4a in the axial direction of the cartridge 3 is less affected and some dispersion is permitted.

However, when dislocation is made between the cartridge chamber lid 8 and the camera main body 4 on a plane perpendicular to the axis of the cartridge 3, since the positional relationship between the positioning shaft 37 and the R claw 31 is disturbed, the cartridge 3 is inclined and there is a possibility that the film cannot be correctly fed.

To cope with this problem, the cartridge loading device of the embodiment takes such a consideration that the presser member 38 which directly supports the positioning shaft 37 is fitted to the opening of the cartridge chamber 4a of the camera main body 4 to thereby correctly establish the positional relationship between the camera main body 4 and the positioning shaft 37 on the above plane.

Figure 21:
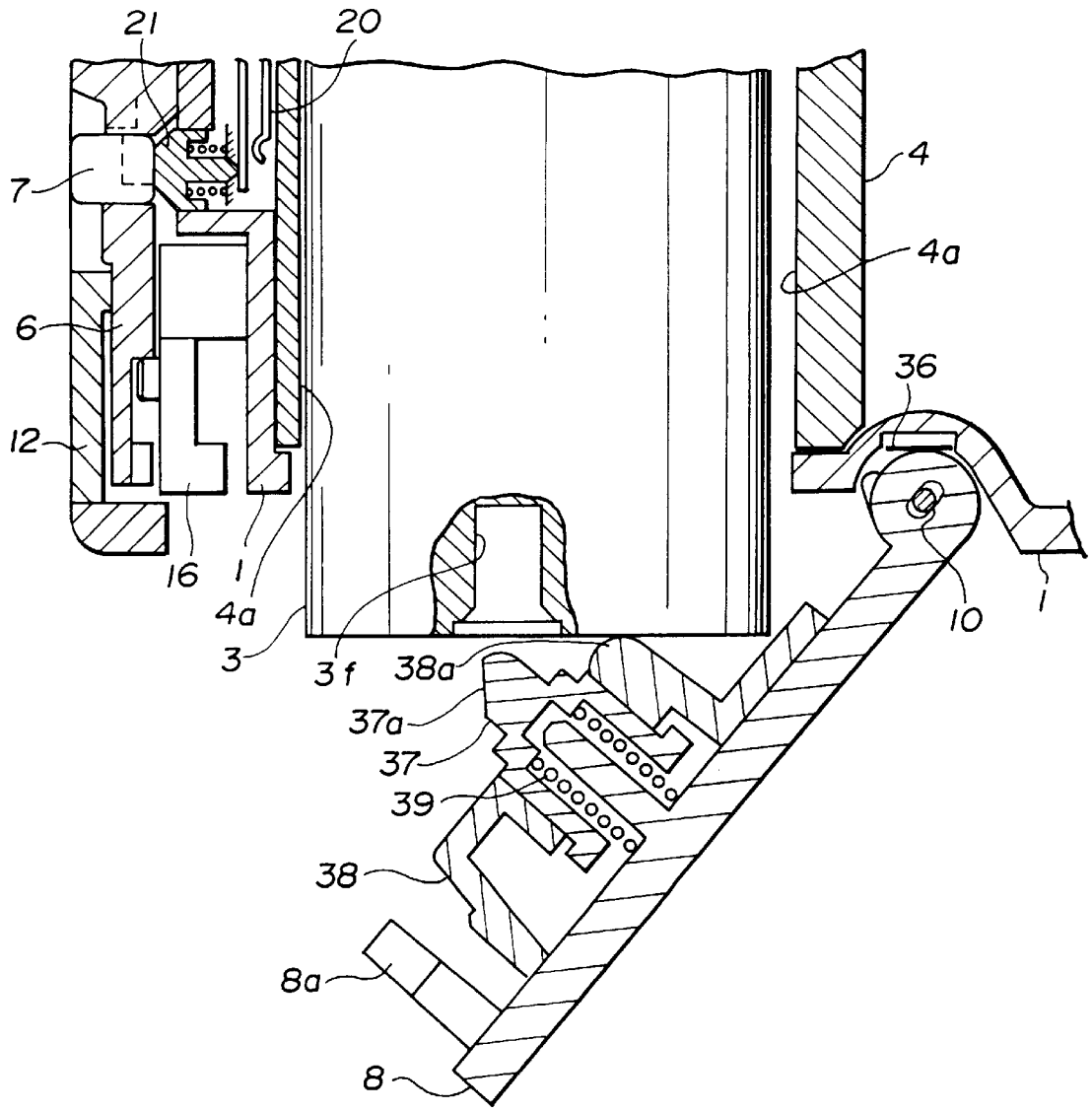
FIG. 21 is a cross sectional view of the portion around the cartridge chamber lid of the camera in FIG. 1 and shows a state that the cartridge chamber lid starts to be closed.

When the cartridge chamber lid 8 is closed in a state that the cartridge 3 is not correctly pushed up to the bottom of the cartridge chamber 4a, the cartridge 3 is pushed up to a predetermined position in such a manner that the end surface of the cartridge 3 is pressed by the pressing portion 38a of the presser member 38 as shown by the cross sectional view of FIG. 21 which shows a state that the cartridge chamber lid starts to close.

Figure 22:
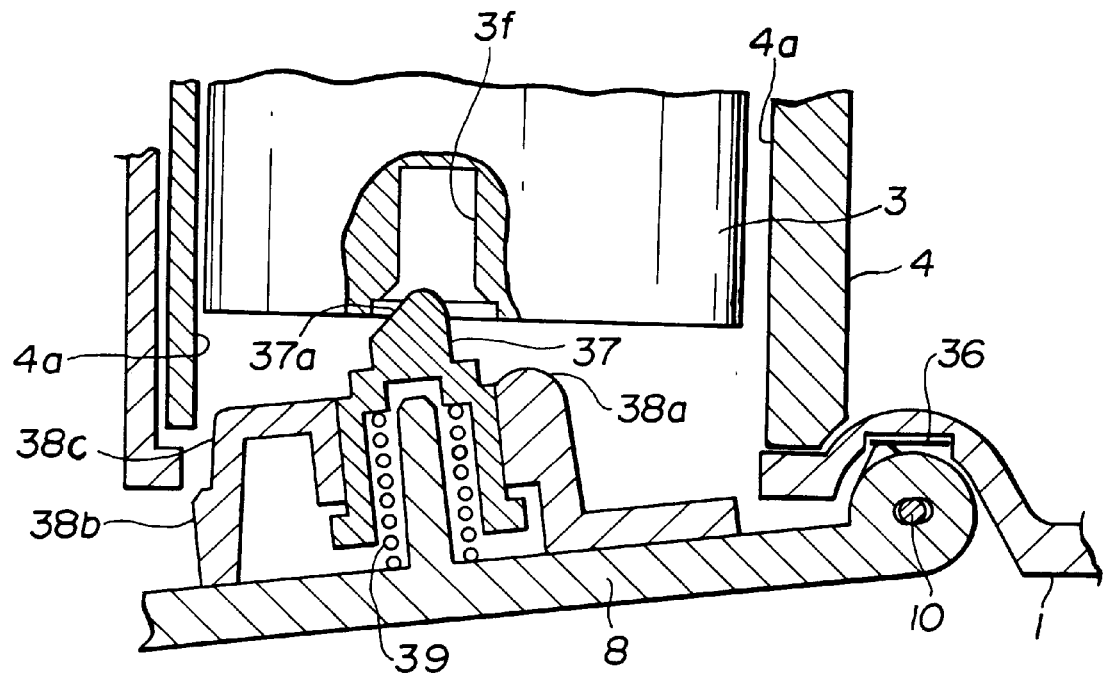
FIG. 22 is a cross sectional view of the portion around the cartridge chamber lid of the camera in FIG. 1 and shows a state just before the cartridge chamber lid is closed.
Figure 23:
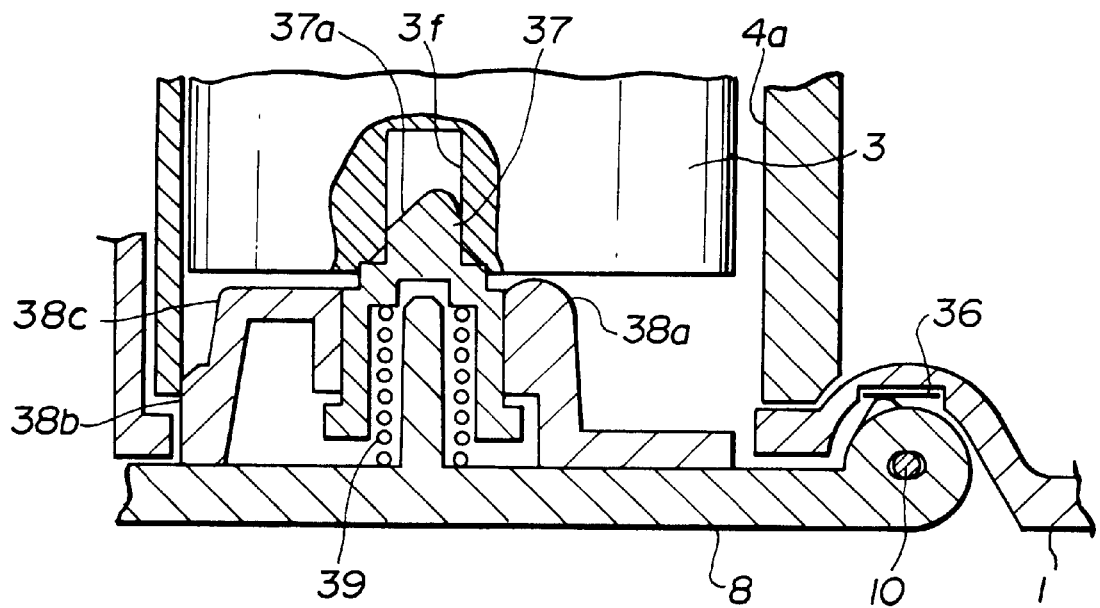
FIG. 23 is a cross sectional view of the portion around the cartridge chamber lid of the camera in FIG. 1 and shows a state that the cartridge chamber lid is closed.

In the cartridge loading device of the embodiment, the positioning shaft 37 has a shortened fitting length on the side thereof where interference takes place on a turning locus as shown in the cross sectional views of FIG. 22 and FIG. 23 which show the states of the portion around the cartridge chamber lid just before it is closed and when it is closed and further the inclined surface 37a is formed to the extreme end of the positioning shaft 37 so that it can be securely meshed.

With the shape of the positioning shaft 37 as described above, even if the cartridge 3 is dislocated, the cartridge chamber lid 8 can be easily closed by causing the positioning hole 3f of the cartridge 3 to be engaged with the positioning shaft 37 while moving the cartridge 3 to a proper position by the inclined surface 37a. Further, the cartridge chamber lid 8 can be easily opened and the positioning shaft 37 can be easily separated from the positioning hole 3f.

As the shape of the extreme end of the positioning shaft 37, it suffices only that the cross sectional shape thereof perpendicular to the hinge shaft 10 as the center axis of turning of the cartridge chamber lid has an inclined shape as shown in FIG. 23.

Figure 24:
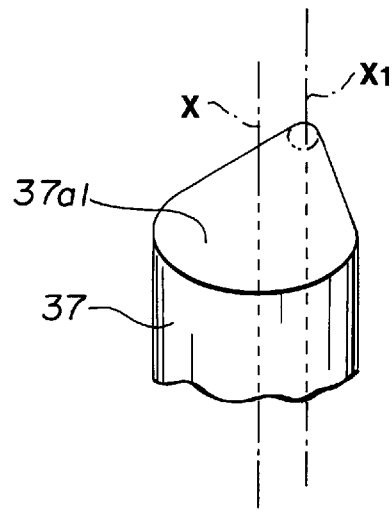
FIG. 24 is a perspective view showing an example of the shape of an extreme end of the positioning shaft of the cartridge chamber lid of the camera in FIG. 1.

As shown by the perspective view of the extreme end in FIG. 24, an example of the extreme end shape of the positioning shaft 37 may be formed of a conical surface 37a1. A conical axial center x1 passing through the apex of the extreme end of the conical surface 37a1 is located on the cross section which passes through the axial center x of the positioning shaft 37 and is perpendicular to the hinge shaft 10 and is eccentric to the axis of the hinge shaft 10 with respect to the axial center x. That is, the extreme end is formed of the conical surface which is located on the cross section perpendicular to the center axis of turning of the cartridge chamber lid 8 with the apex thereof located near to the center of turning of the cartridge lid with respect to the center of the positioning shaft 37.

Figure 25:
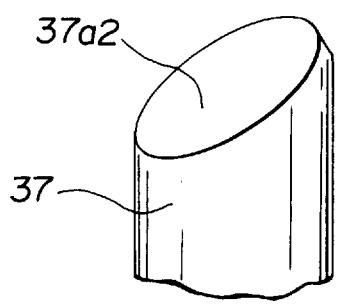
FIG. 25 is a perspective view showing another example of the shape of the extreme end of the positioning shaft of the cartridge chamber lid of the camera in FIG. 1.

As shown by the perspective view of an extreme end shown in FIG. 25, another example of the extreme end shape of the positioning shaft 37 may be formed of a flat surface 37a2 which is inclined with respect to the center axis of the positioning shaft 37. However, it is preferable that the flat surface 37a2 is inclined along a surface parallel with the direction of the hinge shaft 10.

As still another example, the extreme end shape of the positioning shaft 37 may be formed of a curved convex surface along an axis inclined with respect to the axial center of the positioning shaft 37.

Figure 26:
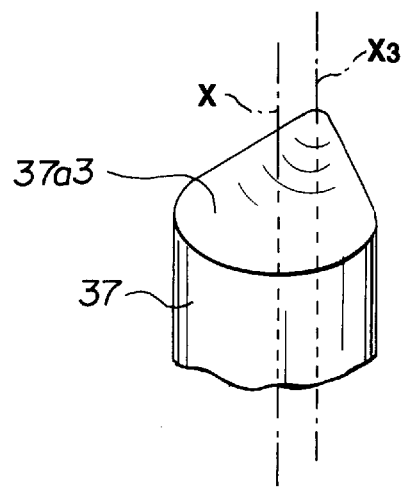
FIG. 26 is a perspective view showing a still another example of the shape of the extreme end of the positioning shaft of the cartridge chamber lid of the camera in FIG. 1.

In addition, as shown by a perspective view of an extreme end in FIG. 26, a further example of the extreme end shape of the positioning shaft 37 may be formed of an inclined spherical surface 37a3 about an axis x3 which is eccentric to the hinge shaft 10 with respect to the axial center x of the positioning shaft 37.

Next, film automatic loading operation of a camera incorporating the cartridge loading device of the embodiment will be described with reference to FIG. 20 which is a block arrangement diagram of a controller, and FIG. 27 showing a flowchart and the like.

First, when the lock button 7 is pushed in the direction of the arrow D of FIG. 8 and it is detected that the SW (A) 20 is turned on at step S110, it is checked whether the film is drawn out from the cartridge at step S111. When it is detected that the film is drawn out therefrom, warning is issued by the PCV 53 (see FIG. 20) at step S112.

Since the sliding operation of the cartridge chamber lid releasing knob 6 cannot be executed unless the lock button 7 is first pushed in as described above, the state that the film is drawn out when the knob is operated can be securely checked and the state can be notified by the warning.

If the film is not drawn out, when the cartridge chamber lid releasing knob 6 is slid while pushing the lock button 7, the drive lever 19 is turned in the direction of the arrow M of FIG. 5 to thereby turn on the SW (B) 24 as well as turning the shading lid opening/closing lever 25 to thereby close the shading lid 3a of the cartridge 3. When it is detected at step S113 that the SW (B) 24 is turned on, the shading lid 3a of the cartridge 3 is closed and it is detected that the cartridge chamber lid 8 is opened.

At step S114, the exposed cartridge 3 is taken out and a new cartridge 3 is pushed into the cartridge chamber of the camera. At the time, the cartridge engaging portion 25c of the shading lid opening/closing lever 25 is engaged with the shading lid 3a of the film cartridge 3 and a shading lid openable state, that is, a shading lid open waiting state is achieved.

When the key seat 3c of the film cartridge 3 is not engaged with the key 31a of the R claw 31 in the loading of the cartridge, the R claw 31 moves and retracts in the direction of an arrow S in FIG. 8.

Subsequently, when the cartridge chamber lid 8 is closed, the locked cartridge chamber lid releasing knob 6 is released and moved to the position shown in FIG. 2 and FIG. 8 by the urging force of the spring 13. At the time, the drive lever 19 turns in the direction of the arrow R of FIG. 6. The turn of the drive lever 19 permits the shading lid opening/closing lever 25 also to turn to thereby open the shading lid 3a of the film cartridge 3.

The lock button 7 is moved to the position shown in FIG. 8 by the urging force of the spring 22 to thereby turn off the SW (A) 20. The off state of the SW (A) 20 is detected at step S115 and when it is detected that the cartridge chamber lid 8 is closed, the process goes to step S116.

At step S116, the film feed motor 51 is reversed. The gear train is rotated in the direction of an arrow V in FIG. 5 by the reverse drive of the motor 51 and the R claw 31 is also rotated according to the rotation of the RW gear (C) 30. When the key 31a of the R claw 31 is rotated to the position where it can be engaged with the key seat 3c of the film cartridge 3, the R claw 31 is slid by the urging force of the spring 32 and engaged with the film cartridge 3. The engagement of them permits a spool (not shown) in the film cartridge 3 to rotate and the data disc 3d is also rotated together with it.

At step S117, the rotating state of the data disc 3d is detected by the photoreflector (A) 33 and the photoreflector (B) 34 to thereby determine the initial position of the data disc 3d.

At step S118, it is determined based on the detected result of the initial position whether a film is not yet used or not and when the film is used or when the film is developed, the data disc is driven in rotation to a film used position, it is determined at step S119 that the data disc is located at the film used position and at step S120 the film feed motor 51 is stopped.

Whereas, when it is determined at step S118 that the film is not used, the data disc 3d is further rotated at step S121 and the information of the data disc 3d, that is, an ISO speed, the number of photographed frames and the like are read.

On the completion of the reading of the information of the data disc 3d, the film feed motor 51 is driven in the forward direction at step S122. The forward drive of the motor 51 causes the gear train to rotate in the direction opposite to the direction of the arrow V in FIG. 5 and the film starts to be fed. When it is detected that the film is fed to a predetermined position, that is, to a photographing possible position at step S123, it is determined that automatic loading is finished and the process goes to step S124 and stops the film feed motor 51. The automatic loading is finished by the above operation.

As described above, in the film loading device of the embodiment, the positioning shaft 37 having the inclined surface at the extreme end thereof is attached to the turnable cartridge chamber lid 8 and the cartridge is positioned by the positioning shaft 37. More specifically, the extreme end of the positioning shaft 37 on the inside of cartridge chamber lid 8 is formed of the inclined surface 37a and the fitting length of the positioning shaft 37 on the side thereof where interference takes place on the rotating locus is shortened to thereby cause the positioning hole 3f of the cartridge 3 to smoothly engage with and separate from the positioning shaft 37. Further, even if the relative position of the cartridge 3 is dislocated before engagement, it is engaged while the positioning hole 3f is guided along the inclined surface 37a, so that the cartridge 3 can be supported in an attitude without inclination.

Note, the extreme end shape of the positioning shaft 37 may be formed of the circular conical surface 37a1, the inclined flat surface 37a2, the curved convex surface, the inclined spherical surface 37a3 or the like in addition to the inclined surface 37a. However, the axial center of the circular conical surface and the inclined spherical surface must be eccentric to the hinge shaft 10 with respect to the axial center of the positioning shaft 37. Further, when the inclined surface and the curved convex surface are employed, the apex thereof must be located on the hinge shaft 10 side as shown in FIG. 23.

Since the parallel portion of the root of the positioning shaft 37 having a suitable length is fitted to the positioning hole 3f, even if a radial urging force is applied to the cartridge 3, no dislocation and the like are caused. Further, since the loaded cartridge 3 is pressed in the direction of arrow E (FIG. 2) by the positioning shaft 37 due to the urging force of the spring 39 assembled to the positioning shaft 37, the end surface of the cartridge 3 can be securely abutted against the reference plane 30a and the film cartridge 3 can be accurately positioned in the axial direction thereof.

Further, the hole of the cartridge chamber lid 8 for supporting the hinge shaft 10 which serves as the rotation support portion to the camera exterior casing 1 is arranged as a slot 8c and looseness is provided with the slot in the direction perpendicular to the axial direction of the cartridge. The cartridge chamber lid 8 has mounted thereon the presser member 38 for holding the positioning shaft 37 which is fitted into the positioning hole 3f of the cartridge 3. Further, the fitting portion 38b which is fitted into the cartridge chamber 4a is diagonally disposed relative to the presser member 38. In the film loading device arranged as described above, the loaded cartridge 3 is accurately positioned in a direction perpendicular to the axis of the cartridge with respect to the cartridge chamber 4a. As a result, the film can be fed in a good state because the cartridge 3 is not inclined and dislocated with respect to the camera main body 4.

What is claimed is:

1. A camera having a film loading device for receiving a film cartridge, comprising:

a camera exterior casing;

a camera main body in which a film cartridge chamber for accommodating the film cartridge is disposed;

a cartridge chamber lid attached to said camera exterior casing and turnable between a position where the film cartridge chamber is closed and a position where the film cartridge chamber is opened, said cartridge chamber lid being turned about a turning axis as well as capable of sliding relative to the camera exterior in a direction perpendicular to the turning axis;

a positioning shaft disposed on said cartridge chamber lid to be coupled with a film cartridge when said cartridge chamber lid is closed for positioning the film cartridge; and a positioning portion disposed on one of said cartridge chamber lid and a presser member which supports the positioning shaft for positioning said cartridge chamber lid relative to the film cartridge chamber;

whereby the position of said positioning shaft is determined.

2. A camera according to claim 1, wherein an inclined surface portion is formed at an extreme end of said positioning shaft to prevent interference between said positioning shaft and an opening in said cartridge when the cartridge lid is moved in a closing direction.

3. A camera according to claim 1, wherein said camera lid has a slot through which a hinge shaft serving as a turning center passes, a cross section of the slot being elongated in a direction along a surface of said cartridge chamber lid which covers the cartridge chamber.

4. A camera according to claim 1, wherein a sliding gap is provided between sides of a turning portion of said cartridge chamber lid and sides of said camera exterior casing adjacent to said turning portion sides to facilitate alignment of the film cartridge.

5. A camera according to claim 1, wherein said positioning portion is fitted to a mouth of the film cartridge accommodating chamber to align said cartridge chamber lid.

6. A camera according to claim 1, wherein said positioning portion is composed of a projected fitting portion.

7. A camera according to claim 1, wherein the accommodating chamber has a drive shaft disposed therein which engages a film cartridge shaft for transmitting a drive force thereto.

8. A film loading device for a film cartridge, comprising:

a camera exterior casing;

a camera main body having a film cartridge chamber for accomodating the film cartridge;

a cartridge chamber lid attached to said camera exterior casing and turnable between a position where the film cartridge chamber is closed and a position where the film cartridge chamber is opened;

a positioning shaft on said cartridge chamber lid coupled with the film cartridge when said cartridge chamber lid is closed, for positioning the film cartridge; and a positioning portion engaging an interior of the cartridge chamber for aligning said cartridge chamber lid with respect to the film cartridge accommodating chamber when said cartridge chamber lid is at a closed position.

9. A camera according to claim 8, comprising a biasing member for urging said positioning shaft in a direction where said positioning shaft is abutted against the film cartridge.

10. A camera according to claim 8, wherein said cartridge chamber lid is arranged to rotate about a given axis and to move linearly along said axis.

11. A camera having a film loading device for a film cartridge, comprising:

an accommodating chamber for accommodating the film cartridge;

a lid member for placing said accommodating chamber in one of an open state and a closed state;

a positioning shaft disposed on said lid member for positioning a shaft of the film cartridge; and a positioning portion for positioning said lid member with respect to said accommodating chamber, said lid member being turnable about, as well as movable in a direction of, a turning axis.

12. A camera having a film loading device for a film cartridge, comprising:

an accommodating chamber for accommodating the film cartridge;

a lid member for placing said accommodating chamber in one of an open state and a closed state;

a positioning shaft disposed on said lid member for positioning a shaft of the film cartridge; and a positioning portion for positioning said lid member with respect to said accommodating chamber, said lid member being turnable about, as well as movable in a direction perpendicular to a direction of the turning axis.

13. A camera having a film loading device for a film cartridge, comprising:

a camera exterior casing;

a camera main body in which a film cartridge chamber for accommodating the film cartridge is disposed;

a cartridge chamber lid attached to said camera exterior casing and mounted to rotate about an axis of rotation between a position where the film cartridge chamber is closed and a position where the film cartridge chamber is opened; and a positioning shaft having a longitudinal central axis and being attached to said cartridge chamber lid and coupled with the film cartridge in a state that, when said cartridge chamber lid is closed, the positioning shaft properly aligns the film cartridge in the cartridge chamber, an apex of an extreme end of said positioning shaft being displaced from said longitudinal axis and located along a line passing through said apex and parallel to said longitudinal central axis, said line being closer to a line passing through said axis of rotation of said cartridge chamber lid than the longitudinal central axis of said positioning shaft.

14. A camera according to claim 13, wherein the end of said positioning shaft has an inclined curved convex surface extending from said apex toward said lid.

15. A camera according to claim 13, wherein the end of said positioning shaft has an inclined flat surface extending from said apex toward said lid.

16. A camera according to claim 13, wherein the end of said positioning shaft has an inclined surface extending from said apex toward said lid, said inclined surface being spherical.

17. A camera according to claim 13, further including an urging member for normally urging said positioning shaft against the film cartridge.

18. A camera having a film loading device for a film cartridge, comprising:

a film cartridge chamber for accommodating the film cartridge;

a cartridge chamber lid mounted to rotate about an axis of rotation and being rotatable about said axis between a position where said film cartridge chamber is closed and a position where the film cartridge chamber is opened; and a positioning shaft having a longitudinal central axis and being engaged with the film cartridge when said cartridge chamber lid is closed for aligning the film cartridge, an extreme end of said positioning shaft being provided with a surface which is inclined relative to said central axis and terminating in an apex which is displaced from said longitudinal axis, said inclined surface being positioned to prevent the extreme end of the positioning shaft from interfering with an engaging portion of the cartridge during closing of the lid.

19. A camera according to claim 18, wherein said inclined surface is one of a conical surface and an inclined surface whose center axis or apex lies along a line which is parallel to said longitudinal central axis, said line being displaced from said longitudinal central axis and being closer to the turning shaft than said central axis.

20. A camera having a cartridge chamber for accommodating a film cartridge having a housing with at opposite ends thereof and a spool shaft around which a film is wound therein and a lid member for selectively opening/closing the cartridge chamber when the film cartridge is loaded in the cartridge chamber, comprising:

a camera main body having an opening disposed to the cartridge chamber for loading the film cartridge therethrough;

a lid support shaft for swingably supporting the lid member;

said lid member being movable about said shaft between a position where the opening of the cartridge chamber is exposed and a position where the opening thereof is closed when said lid member closes the opening of said cartridge chamber;

each end of said spool shaft having a hole, each being aligned with one of the holes in said housing;

a cartridge aligning shaft disposed on said lid member so as to be fitted into a hole at one end of the spool shaft of the cartridge; and a positioning portion disposed on said lid member and fitted to and engaging the opening in the camera main body and cooperating with the cartridge aligning shaft for aligning said spool shaft at a predetermined position when the lid member is closed to thereby position the film cartridge at a proper position in said cartridge chamber.

21. A camera according to claim 20, wherein said lid member has an opening receiving said lid support shaft, said opening having a size and shape enabling linear movement of said lid relative to said lid support shaft as said lid rotates toward the closed position to facilitate insertion of said positioning portion into the opening in the camera main body.

22. A camera according to claim 20, wherein said cartridge aligning shaft has one of an inclined surface, a conical surface and a spherical surface formed at an apex thereof for permitting the cartridge aligning shaft to be easily engaged with said hole at said one end of said spool shaft.

23. The camera of claim 20 wherein said positioning portion of said lid makes substantially point contact at a plurality of locations along a surface of the cartridge chamber opening in said main camera body.

24. The camera of claim 20 wherein said positioning portion of said lid has a plurality of projections which make point contact at spaced points along the surface of said cartridge chamber opening in the main camera body.

25. A camera having a film loading device for a film cartridge, comprising:

a camera exterior casing;

a camera main body in which a film cartridge chamber for accommodating the film cartridge is disposed;

a cartridge chamber lid attached to said camera exterior casing and mounted to rotate about an axis between a position where the film cartridge chamber is closed and a position where the film cartridge chamber is opened; and a positioning shaft having a longitudinal central axis being attached to said cartridge chamber lid and coupled with the film cartridge in a state that, when said cartridge chamber lid is closed, the positioning shaft aligns the film cartridge, an apex of an extreme end of said positioning shaft having a curved surface and being displaced from the longitudinal central axis of the positioning shaft, and lying on a line passing through said apex and parallel to said longitudinal central axis whereby said line is closer to said axis of rotation of said lid than said longitudinal central axis;

the curved surface of the positioning shaft being a conical surface.

* * * * *